(12) United States Patent
Lu et al.

(10) Patent No.: US 9,672,226 B2
(45) Date of Patent: Jun. 6, 2017

(54) METHOD TO IDENTIFY AN OBJECT AND A SYSTEM FOR DOING THE SAME

(71) Applicants: Agency for Science, Technology and Research, Singapore (SG); Illinois At Singapore Pte Ltd, Singapore (SG)

(72) Inventors: Jiangbo Lu, Singapore (SG); Gang Wang, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 496 days.

(21) Appl. No.: 14/354,274

(22) PCT Filed: Oct. 25, 2012

(86) PCT No.: PCT/SG2012/000403
§ 371 (c)(1),
(2) Date: Apr. 25, 2014

(87) PCT Pub. No.: WO2013/062487
PCT Pub. Date: May 2, 2013

(65) Prior Publication Data
US 2014/0304271 A1    Oct. 9, 2014

(30) Foreign Application Priority Data
Oct. 27, 2011    (SG) .................. SG201107893-8

(51) Int. Cl.
*G06K 9/00* (2006.01)
*G06F 17/30* (2006.01)
(Continued)

(52) U.S. Cl.
CPC ..... *G06F 17/30247* (2013.01); *G06K 9/3241* (2013.01); *G06K 9/34* (2013.01);
(Continued)

(58) Field of Classification Search
None
See application file for complete search history.

(56) References Cited

U.S. PATENT DOCUMENTS 6,535,637 B1 * 3/2003 Wootton ................ B65B 57/00
221/102
8,682,047 B2 * 3/2014 Lang .................... G06K 9/3241
382/128
(Continued)

OTHER PUBLICATIONS

Hartl Andreas Daniel, Arth Clemens, Schmalstieg Dieter, Instant Medical Pill Recognition on Mobile Phones, Proceedings of the IASTED International Conference on Computer Vision, pp. 188-195, Jun. 2011.*

(Continued)

*Primary Examiner* — Andrae S Allison
(74) *Attorney, Agent, or Firm* — K. David Crockett, Esq.; Paul J. Backofen, Esq.; Crockett & Crockett, PC

(57) ABSTRACT

Various embodiments relate to a method to identify an object comprising: receiving an image, the image having an object in front of a background; segmenting the image into a segmented image using a segmentation technique, the segmented image having a foreground component showing at least a part of the object and a background component showing at least a part of the background; determining at least one property of the foreground component of the segmented image; and matching the at least one property of the foreground component with a database of identified objects having the corresponding at least one property to identify the object.

13 Claims, 22 Drawing Sheets

(51) Int. Cl.
*G06K 9/32* (2006.01)
*G06K 9/34* (2006.01)
*G06K 9/46* (2006.01)
*G06K 9/48* (2006.01)
*G06K 9/62* (2006.01)
*G06T 7/11* (2017.01)
*G06T 7/90* (2017.01)
*G06T 7/194* (2017.01)
*G06K 9/50* (2006.01)

(52) U.S. Cl.
CPC ............. *G06K 9/4652* (2013.01); *G06K 9/48* (2013.01); *G06K 9/6211* (2013.01); *G06K 9/6212* (2013.01); *G06T 7/11* (2017.01); *G06T 7/194* (2017.01); *G06T 7/90* (2017.01); *G06K 9/50* (2013.01); *G06T 2207/10024* (2013.01); *G06T 2207/30088* (2013.01)

(56) References Cited

U.S. PATENT DOCUMENTS

| | | | | |
|---|---|---|---|---|
| 8,712,163 B1* | 4/2014 | Osheroff | ................... | G06K 9/00 382/149 |
| 2003/0198387 A1* | 10/2003 | Acharya | .............. | G06K 9/4647 382/199 |
| 2010/0158386 A1* | 6/2010 | Smilansky | .............. | G01F 22/00 382/194 |
| 2011/0170786 A1* | 7/2011 | Naini | .................... | G06T 7/0083 382/199 |
| 2012/0057783 A1* | 3/2012 | Yamada | ................ | G06T 7/0081 382/165 |
| 2012/0275694 A1* | 11/2012 | Fan | ........................ | G06T 7/0081 382/164 |
| 2012/0288188 A1* | 11/2012 | Oto | ......................... | H04N 19/14 382/164 |
| 2013/0329058 A1* | 12/2013 | Brossette | .............. | G06T 7/0083 348/207.1 |

OTHER PUBLICATIONS

Andreas Hartl, Computer-Vision Based Pharmaceutical Pill Recognition on Mobile Phones, Proceedings of CESCG 2010: The 14th Central European Seminar on Computer Graphics, pp. 8.*

S. Ray and R. Turi. Determination of number of clusters in k-means clustering and application in colour image segmentation. In N. Pal, D, A. K., and J. Das, editors, Proceedings of the 4th International Conference on Advances in Pattern Recognition and Digital Techniques (ICAPRDT'99), pp. 137-143, New Delhi, India, Dec. 27-29, 1999.*

Lee et al, Pill-ID: Matching and retrieval of drug pill images, Pattern Recognition Letters 33 (2012) 904-910.*

Hema et al, The Identification of Pill Using Feature Extraction in Image Mining, ICTACT Journal on Image and Video Processing, Feb. 2015, vol. 05, Issue: 03.*

Cunha et al, HelpmePills: a mobile pill recognition tool for elderly persons, Procedia Technology 16 ( 2014) 1523-1532.*

* cited by examiner

FIG. 1

100 receiving an image, the image having an object in a front of a background
↖ 102

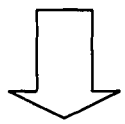

segmenting the image into a segmented image using a segmentation technique, the segmented image having a foreground component showing at least a part of the image of the object and a background component showing at least a part of the background
↖ 104

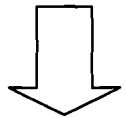

determining at least one property of the foreground component of the segmented image
↖ 106

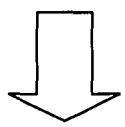

matching the at least one property of the foreground component with a database of identified objects having the corresponding at least one property to identify the object
↖ 108

1602

1702

FIG. 18
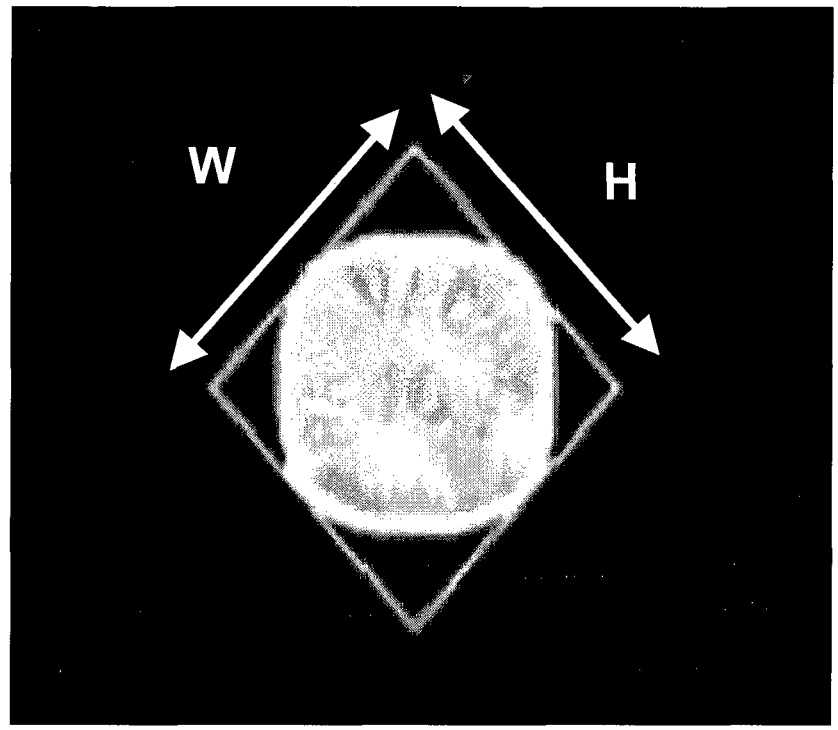
FIG. 19
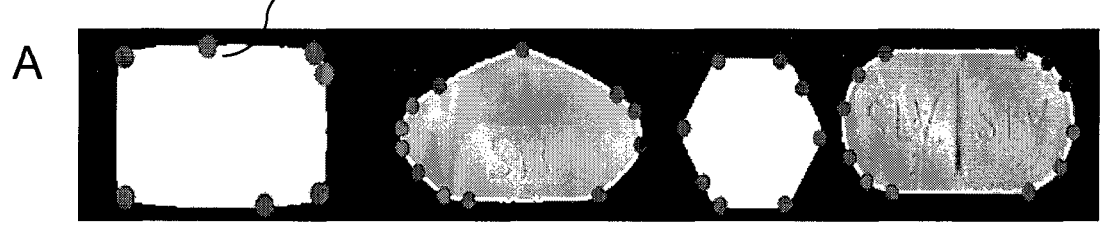
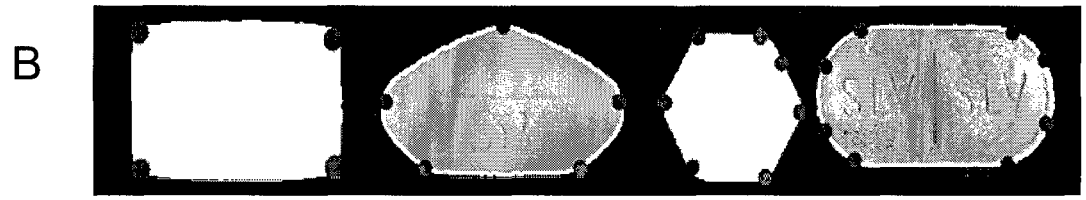

FIG. 26
A yellow 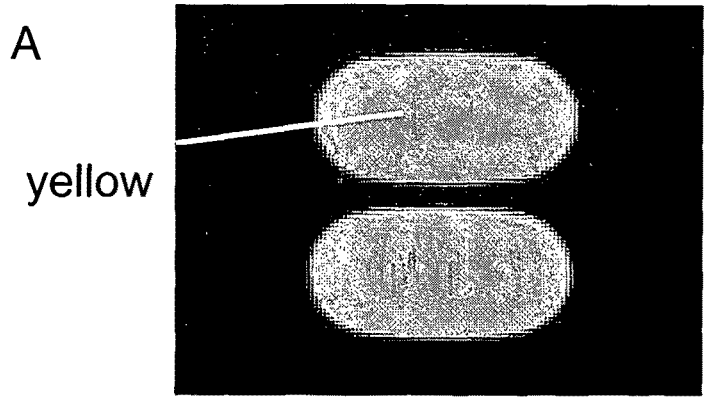 One or single colour pill (Yellow, _, _ )
B yellow 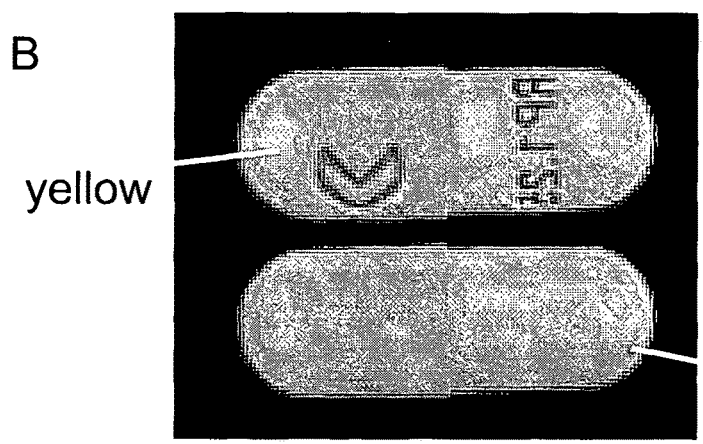 Two-colour pill (Yellow, White, _ )
white
C yellow orange 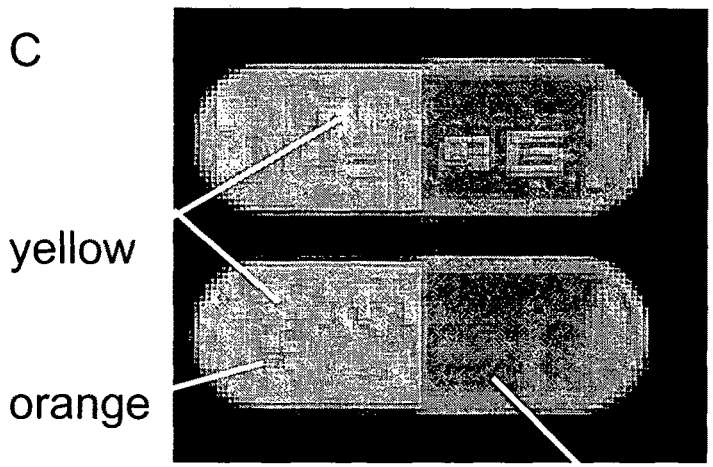 Three-colour or more pill (Red, Orange, Yellow)
red

METHOD TO IDENTIFY AN OBJECT AND A SYSTEM FOR DOING THE SAME

CROSS-REFERENCE TO RELATED APPLICATION

This application claims the benefit of priority of SG application No. 201107893-8 filed Oct. 27, 2011, the contents of it being hereby incorporated by reference in its entirety for all purposes.

TECHNICAL FIELD

The present invention relates to identification of objects.

BACKGROUND

People consume various pills every day. To keep them organized, a person may need to carry a pillbox containing a myriad of pills. Having different pills in one location or container may confuse the user about the names of the pills and their dosage instructions.

There exist pill identification guidebooks and pill identification aids on the Internet, but they are difficult to use. For instance, a person seeking to know the name and dosage instruction of a pill in his possession looking on an Internet guide will need to specify the shape of the pill such as whether the mystery pill is rectangular or oblong (among other shapes), or to specify the colour of the pill, that is, whether it is beige, tan, or gray. This is cumbersome and inconvenient for the user.

As such, an object of the invention is to devise a method and a device employing this method to reduce some of the inconvenience faced by the user.

SUMMARY OF THE INVENTION

Various embodiments relate to a method to identify an object comprising receiving an image, the image having an object in front of a background, segmenting the image into a segmented image using a segmentation technique, the segmented image having a foreground component showing at least a part of the object and a background component showing at least a part of the background, determining at least one property of the foreground component of the segmented image and matching the at least one property of the foreground component with a database of identified objects having the corresponding at least one property to identify the object.

Various embodiments relate to a system for identifying an object comprising an image receiver to receive an image, the image having the object in front of a background, a segmentor to segment the image into a segmented image using a segmentation technique, the segmented image having a foreground component showing at least a part of the object and a background component showing at least a part of the background, a determinor to determine at least one property of the foreground component of the segmented image and a matcher to match the at least one property of the foreground component with a database of identified objects having the corresponding at least one property to identify the object.

BRIEF DESCRIPTION OF THE DRAWINGS

The invention will be better understood with reference to the detailed description when considered in conjunction with the non-limiting examples and the accompanying drawings, in which:

FIG. 1 shows a general flowchart illustrating a method to identify an object according to various embodiments.

FIG. 18 shows an image of a tablet in which the width and the height of the bounding box rotated clockwise or anti-clockwise are measured according to various embodiments.

FIG. 19A shows various shapes, each shape formed by an original plurality of points according to various embodiments. FIG. 19B shows various shapes, each shape formed by a reduced plurality of points according to various embodiments.

FIG. 26A illustrates identifying a foreground component of a segmented image of a tablet having one colour according to various embodiments. FIG. 26B illustrates identifying a foreground component of a segmented image of a capsule having two colours according to various embodiments. FIG. 26C illustrates identifying a foreground component of a segmented image of a capsule having three colours according to various embodiments.

DETAILED DESCRIPTION OF THE INVENTION

Figure 2:
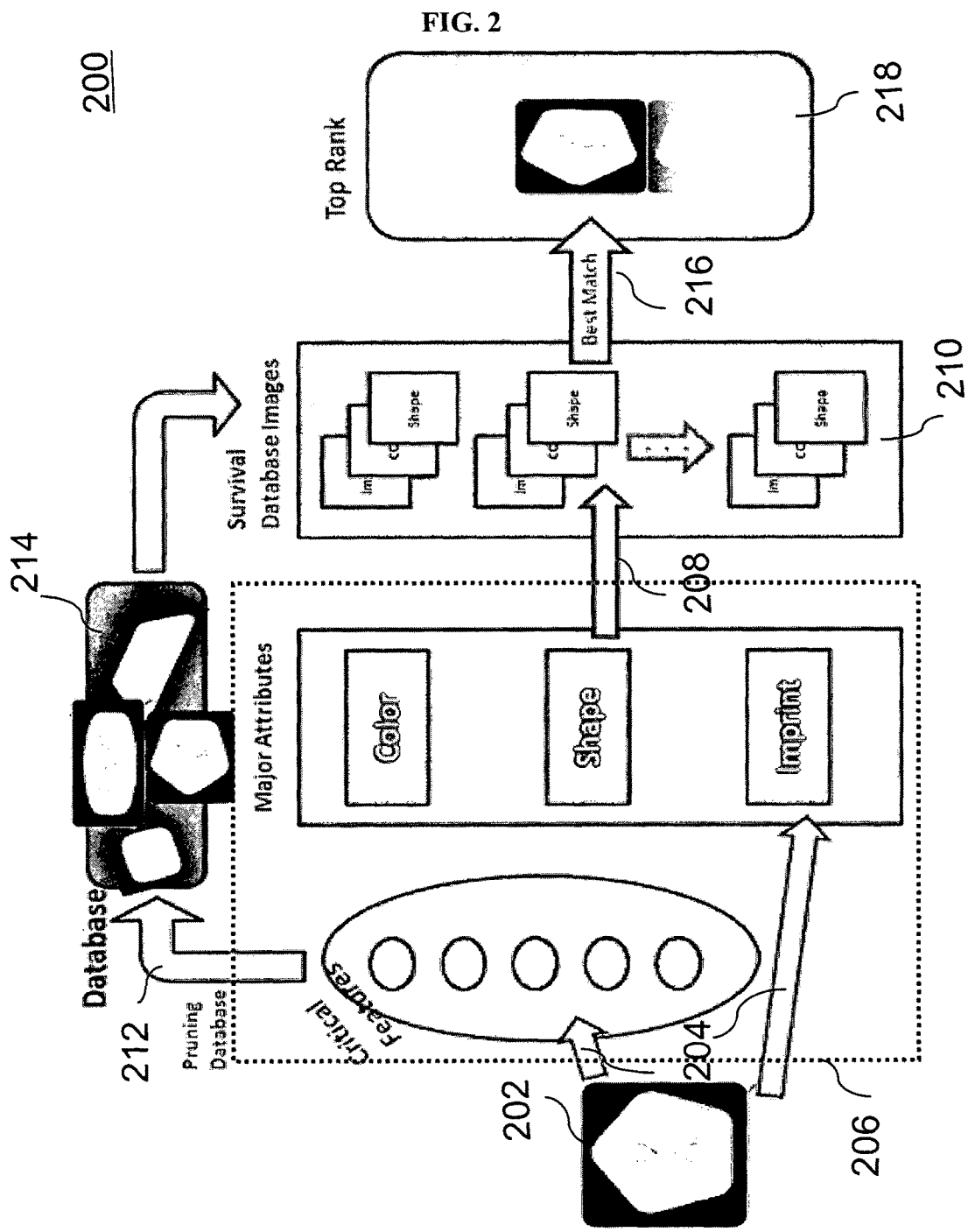
FIG. 2 shows a detailed flow diagram illustrating a method to identify an object according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

FIG. 1 shows a method 100 to identify an object comprising receiving an image, the image having an object in front of a background 102, segmenting the image into a segmented image using a segmentation technique 104, the segmented image having a foreground component showing at least a part of the object and a background component showing at least a part of the background, determining at least one property of the foreground component of the segmented image 106, and matching the at least one property of the foreground component with a database of identified objects having the corresponding at least one property to identify the object 108.

In other words, an image of the object is first captured together with the accompanying background. An imaging device or component such as a camera or a video recorder may be used. The image device or receiver may be more generally referred to as an image receiver. The image of the object together with the background is then processed using a segmentation technique to segment the image into a foreground component and a background component. The foreground component comprises at least a part of the object. Preferably, the foreground component comprises primarily of the object. In various embodiments, more than about 80% or more than about 90% or more than about 95% of the foreground component may comprise of the object. The background component comprises at least a part of the background. At least one property of the foreground component is determined and matched with a database of known or identified objects. The database of known or identified objects may comprise images and/or properties of the objects. The at least one property of the foreground component is matched with the images and/or properties of the known or identified objects in the database, thus linking the object to one or more than one known or identified objects and therefore helping to identify the object.

The segmentation and/or determination of the at least one property of the object may be carried out using a processor or computer or a microcontroller or any component or device with such processing capabilities. The component or device performing segmenting is referred to as a segmentor. The component or device performing determination of the at least one property of the foreground component is referred to as a determinor. The component or device matching the at least one property of the foreground component with a database of identified objects is referred to as a matcher. The database may be stored locally such as in the processor or computer or a memory or a hard disk or may be stored remotely such as in a remote server or in an external storage medium in communication with the component or device performing the segmentation and/or determination of the at least one property of the object. In various embodiments, imaging, segmentation and determination is carried out using a single device, such as a mobile device with an integrated camera. In various embodiments, one or more of the above steps may be carried out in separate devices forming a system. In various embodiments, the database is stored in the mobile device and the matching and identification can be carried out within the same device. Alternatively, the mobile device may also communicate with a database in a remote server to match and identify the object. The results are then displayed on a screen of the mobile device. In various embodiments, the mobile device is a mobile phone or a tablet computer. Imaging of the object may be performed using an integrated camera or imaging component of the mobile phone or tablet. Segmenting and determination of the at least one property may be carried out using a processor in the mobile phone or tablet. Communication with a database may be carried out using a transceiver.

In other words, various embodiments relate to a system for identifying an object comprising an image receiver to receive an image, the image having the object in front of a background; a segmentor to segment the image into a segmented image using a segmentation technique, the segmented image having a foreground component showing at least a of the object and a background component showing at least a part of the background; a determinor to determine at least one property of the foreground component of the segmented image; and a matcher to match the at least one property of the foreground component with a database of identified objects having the corresponding at least one property to identify the object. In various embodiments, the system comprises a single device. In other words, two or more of from the group consisting of the image receiver, the segmentor, the determinor and the matcher may be located together in a single device, or in separate devices forming a system. In various embodiments, all of from the group consisting of the image receiver, the segmentor, the determinor and the matcher are in a single device, ie. the system comprises a single device.

In this manner, the object can be easily identified with less hassle. In various embodiments, the object may be a pill. The object may also be a tablet, a capsule or a caplet. These objects often come with fixed, standardised properties such as shape, colour or imprint. In this manner, a user seeking to know the identity of a pill, a tablet, a capsule or a caplet may do so with less hassle as he does not need to remember the properties of the pill, tablet, capsule or caplet such as the colour or the shape or manually look up a guide to identify the pill, tablet, capsule or caplet. In addition, the database may contain and provide the user with information such as the dosage instructions, the ingredients of the identified pill, tablet, capsule or caplet.

In various embodiments, the object may also be other substances with a fixed or standardised shape or colour or any other identifier which allows the image of the object to be compared to a database and be easily identified. For instance, the object may be a fruit. There are many varieties of fruits having varying shapes and colours. It may be desirable to identify an unidentified fruit to find out for instance its nutritional value.

In various embodiments, identifying the object involves receiving an image, the image having an object in front of a background, determining at least one property of the image, and matching the at least one property of the image with a database of identified objects having the corresponding at least one property to identify the object.

FIG. 2 shows a detailed flow diagram 200 illustrating a method to identify an object according to various embodiments. Determining at least one property of the foreground component of the segmented object 202 is carried out in 204. The at least one property of the foreground component 206 is matched or compared with the corresponding property of identified objects stored in a database (called database images) 210 in 208. The at least one property of the object may be a critical feature or a attribute such as colour or shape or imprint of the foreground component. The database 214 maybe built up by inputing images of identified objects and/or inputing the properties of identified objects and associating the properties with the identified objects. The database 214 can be updated or pruned from time to time under 212. One or more database images of identified objects may be linked with the foreground component in 216 after matching. The object 210 from which the foreground component originates is thus identified in 218.

In various embodiments, matching the at least one property of the foreground component with a database of identified objects includes determining the corresponding property of each identified object and determining the closeness of the at least one property of the foreground component with the corresponding property of each identified object. In various embodiments, matching the at least one property of the foreground component with a database of identified objects includes determining the closeness of the at least property of the foreground component with the corresponding property of identified objects which are already stored in the database.

In various embodiments, the database images 210 are ranked according to the degree of closeness with the at least one property of the foreground component of the segmented object 202 and the database image with the highest degree of closeness with the at least one property of the foreground component 202 is then matched with the foreground component 202. In other words, matching the at least one property of the foreground component 202 with a database 214 of identified objects involves ranking identified object in the database 214 based on the closeness or similarity of each identified object in the database 214 and the foreground component of the segmented image 202. The highest ranked identified object is used to identify the object.

In various embodiments, matching involves comparing or matching more than one property of the foreground component 202 with the database images 210 under 218. The closest database image is then linked with the object 202 based on all properties of the object 202 compared.

For instance, ranking can be made between the database images based on similarities or closeness in colour, shape and imprint of each database image and the foreground component of the segmented image. The following formula may be used Overall score=$\alpha_1 \times$colour similarity+$\alpha_2 \times$shape similarity+$\alpha_3 \times$imprint similarity (1)

where $\alpha_1$, $\alpha_2$ and $\alpha_3$ are predefined constants.

In various embodiments, matching the at least one property of the foreground component with a database of identified objects involves discarding identified objects in the database which do not meet predetermined thresholds from further consideration and linking the remaining identified objects with the object. Advantageously, this technique will shorten the processing time in matching the at least one property of the foreground component with the database as the computational time for such a technique is less than that of ranking. This technique is especially useful when the database is large.

In various embodiments, matching the at least one property of the foreground component with a database of identified objects may involve discarding identified objects in the database which do not meet predetermined thresholds from further consideration and linking the remaining identified objects with the object, determining the corresponding property of each remaining identified object and determining the closeness of the at least one property of the foreground component with the corresponding property of each remaining identified object. Advantageously, this will help to shorten the processing time compared to than ranking all identified objects in the database with the object.

Advantageously, matching using the abovementioned techniques are better suitable than techniques such as decision trees or support vector machines, which are more complex and are intrinsically static.

In various embodiments, further segmenting of the image using one or more segmentation techniques may be carried out. At least one property of the foreground component of the further segmented images is determined and matched with the database of identified objects having the corresponding at least one property. Advantageously, if there is more than one identified object which match the first segmented image, further segmented images produced by further segmenting using additional segmentation techniques may help to identify the object.

Figure 3:
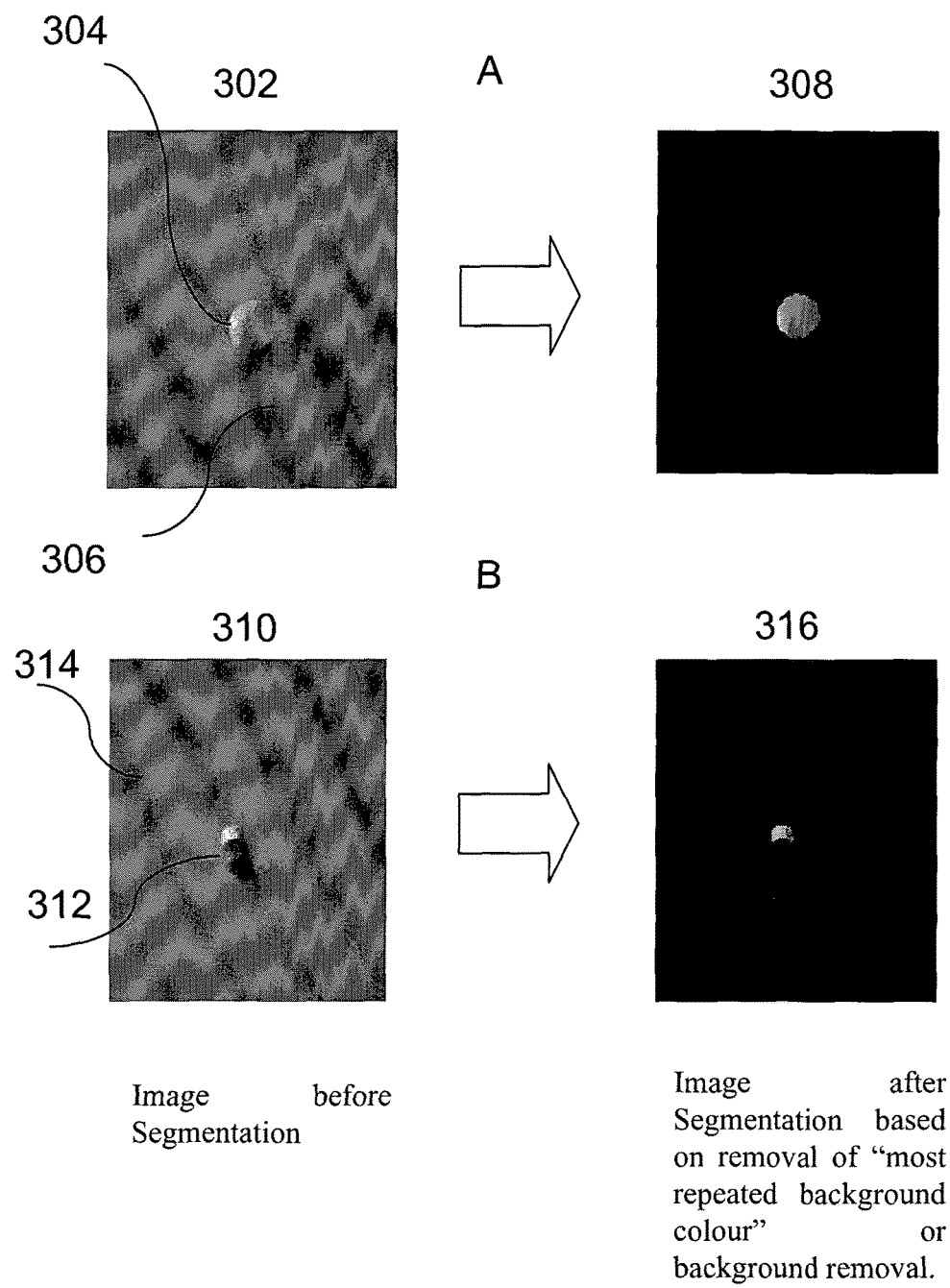
FIG. 3A shows an image of a pill in front of a background before applying a segmentation technique called most repeated colour removal or background subtraction and an image after applying the segmentation technique according to various embodiments.
FIG. 3B shows an image of a capsule in front of a background before applying most repeated colour removal or background subtraction and an image after applying the segmentation technique according to various embodiments.

There may be different segmentation techniques. FIG. 3A shows an image 302 of a pill 304 in front of a background 306 before applying a segmentation technique called most repeated colour removal or background subtraction and an image 308 after applying the segmentation technique according to various embodiments. FIG. 3B shows an image 310 of a capsule 312 in front of a background 314 before applying most repeated colour removal or background subtraction and an image 316 after applying the segmentation technique according to various embodiments. This segmentation technique works by finding a range of colour which occurs repeatedly in the image and categorizes the pixels or points having the range of colour as the background component. The background component is then removed or set to black. This technique is suitable for images in which the object 304 or 312 has a very different colour from background 306 or 314. As seen in FIG. 3B, this technique is not satisfactory if the colour of the object 312 is close to the background 314. In FIG. 3B, only half of the capsule 312 is determined to be the foreground component. The other half of the capsule 312 is determined to be the background component together with the background.

Another segmentation technique is skin colour detection technique which is based on the colour or range of skin colour information. Skin colour information may be based on red-green-blue (RGB) space such as in equations (2) and (4) or in the hue-saturation-value (HSV) space such as in equation (5). This segmentation technique assumes that the background is predominantly a palm of a human.

$$0.5 > \frac{R}{R+G+B} > 0.35, R+G+B < 200 \text{ or} \qquad (2)$$
$$0.7 > \frac{R}{R+G+B} > 0.5, R+G+B > 200$$

$$R > 95, G > 40, B > 20, \qquad (3)$$
$$\text{Max}(R, G, B) - \text{Min}(R, G, B) > 15, R - G > 15, R > B$$

$$\frac{(h+51)}{100} \times 256 < 102 \qquad (4)$$

R, G and B in equations 2 and 3 represent red, green and blue components or channels in the RGB colour space respectively. h in equation 4 represent the hue component or channel in the HSV colour space. Pixel having colours that fulfill the abovementioned equations will be categorized to be in the background component FIG. 4A shows an original image of a capsule 402 in front of a palm 404 as background. FIG. 4B shows the segmented image (background component removed) after applying equation (2) according to various embodiments. FIG. 4C shows the segmented image (background component removed) after applying equation (3) according to various embodiments. FIG. 4D shows the segmented image (background component removed) after applying equation (4) according to various embodiments.

FIG. 5A shows an original image of a capsule 502 in front of a palm 504 as background. FIG. 5B shows the segmented image (background component removed) after applying equation (2) according to various embodiments. FIG. 5C shows the segmented image (background component removed) after applying equation (3) according to various embodiments. FIG. 5D shows the segmented image (background component removed) after applying equation (4) according to various embodiments.

FIG. 6A shows an original image of a caplet 602 in front of a palm 604 as background. FIG. 6B shows the segmented image (background component removed) after applying equation (2) according to various embodiments. FIG. 6C shows the segmented image (background component removed) after applying equation (3) according to various embodiments. FIG. 6D shows the segmented image (background component removed) after applying equation (4) according to various embodiments.

Figure 4:
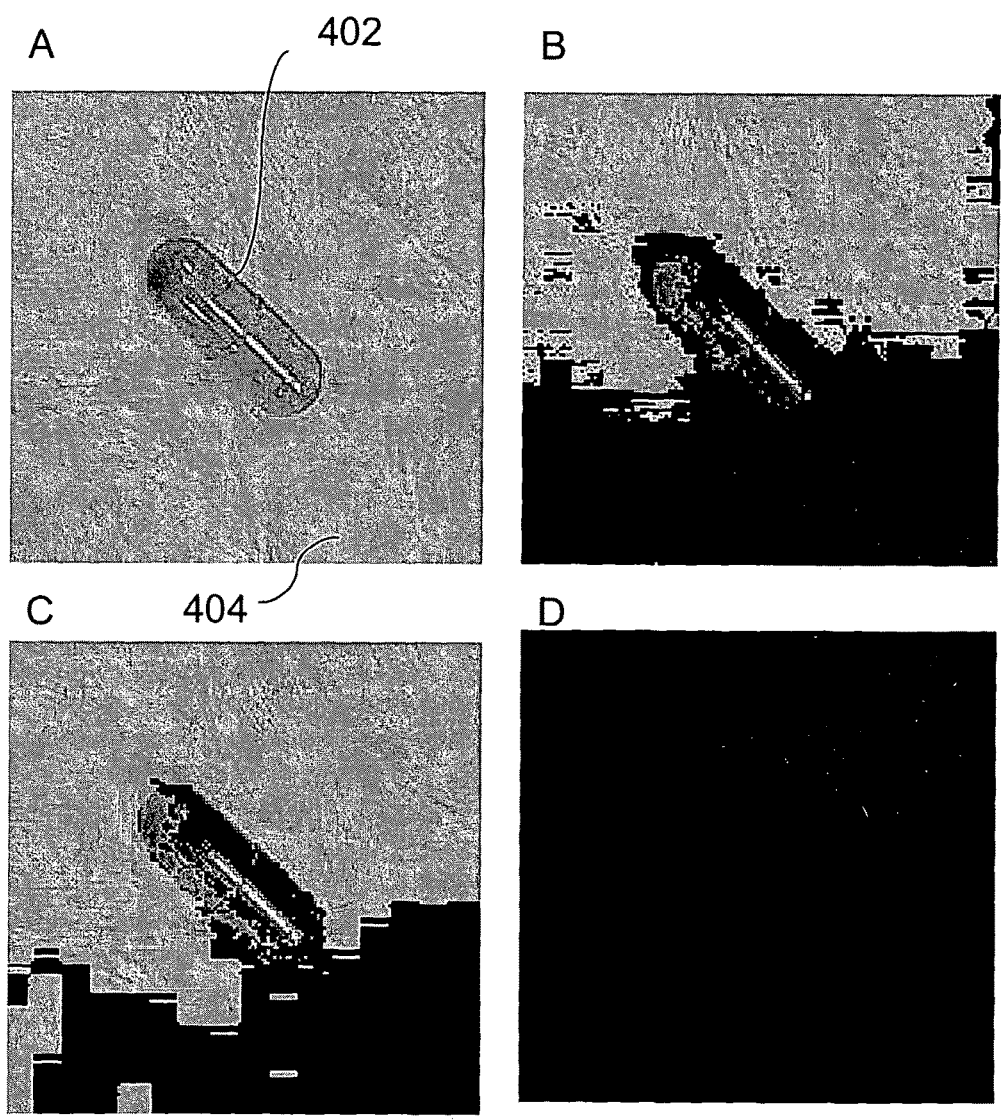
FIG. 4A shows an original image of a capsule in front of a palm as background.
FIG. 4B shows the segmented image (blackground component in black) after applying equation (2) according to various embodiments.
FIG. 4C shows the segmented image (blackground component in black) after applying equation (3) according to various embodiments.
FIG. 4D shows the segmented image (blackground component in black) after applying equation (4) according to various embodiments.
Figure 5:
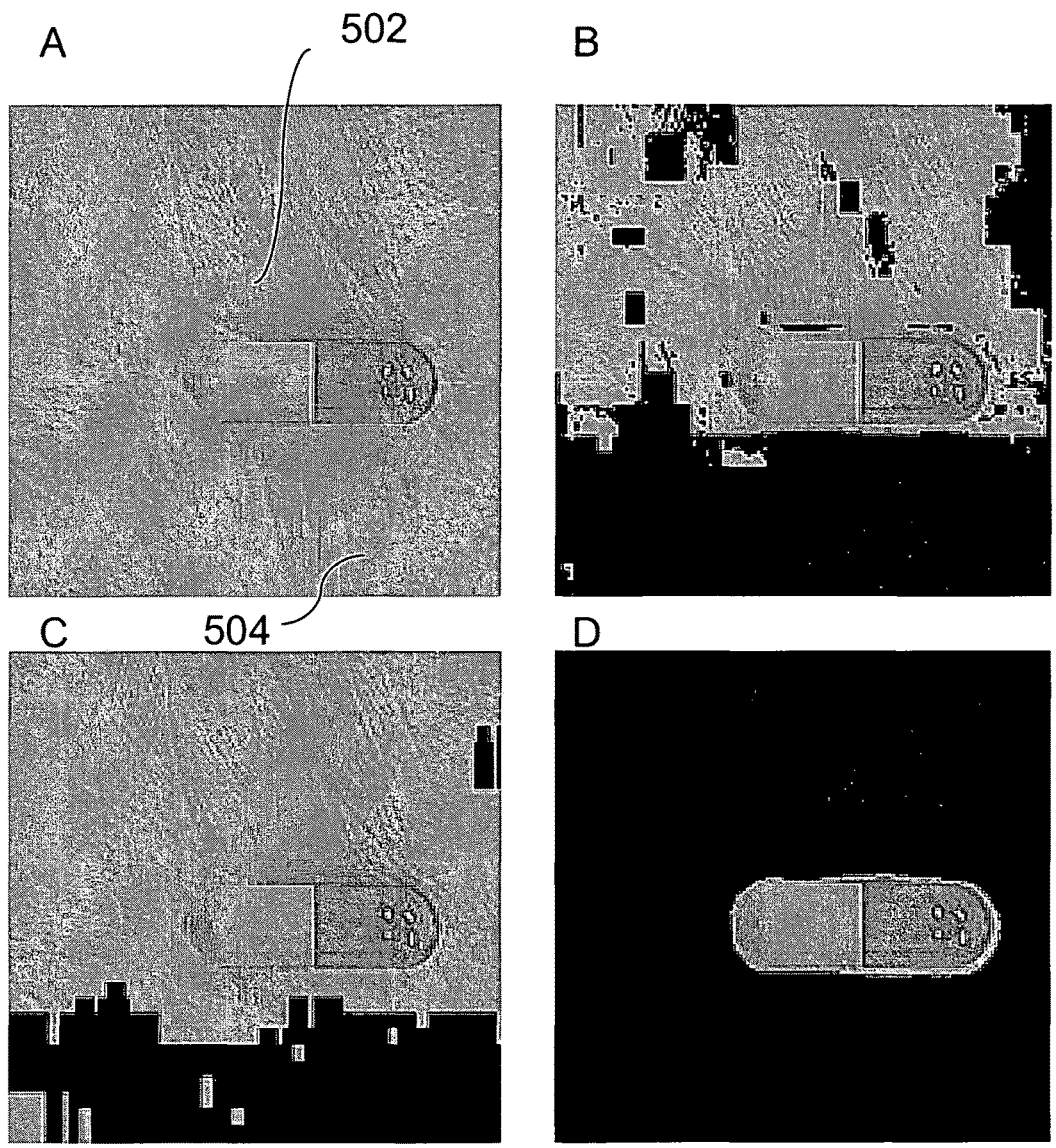
FIG. 5A shows an original image of a capsule with a palm as background.
FIG. 5B shows the segmented image (blackground component in black) after applying equation (2) according to various embodiments.
FIG. 5C shows the segmented image (blackground component in black) after applying equation (3) according to various embodiments.
FIG. 5D shows the segmented image (blackground component in black) after applying equation (4) according to various embodiments.
Figure 6:
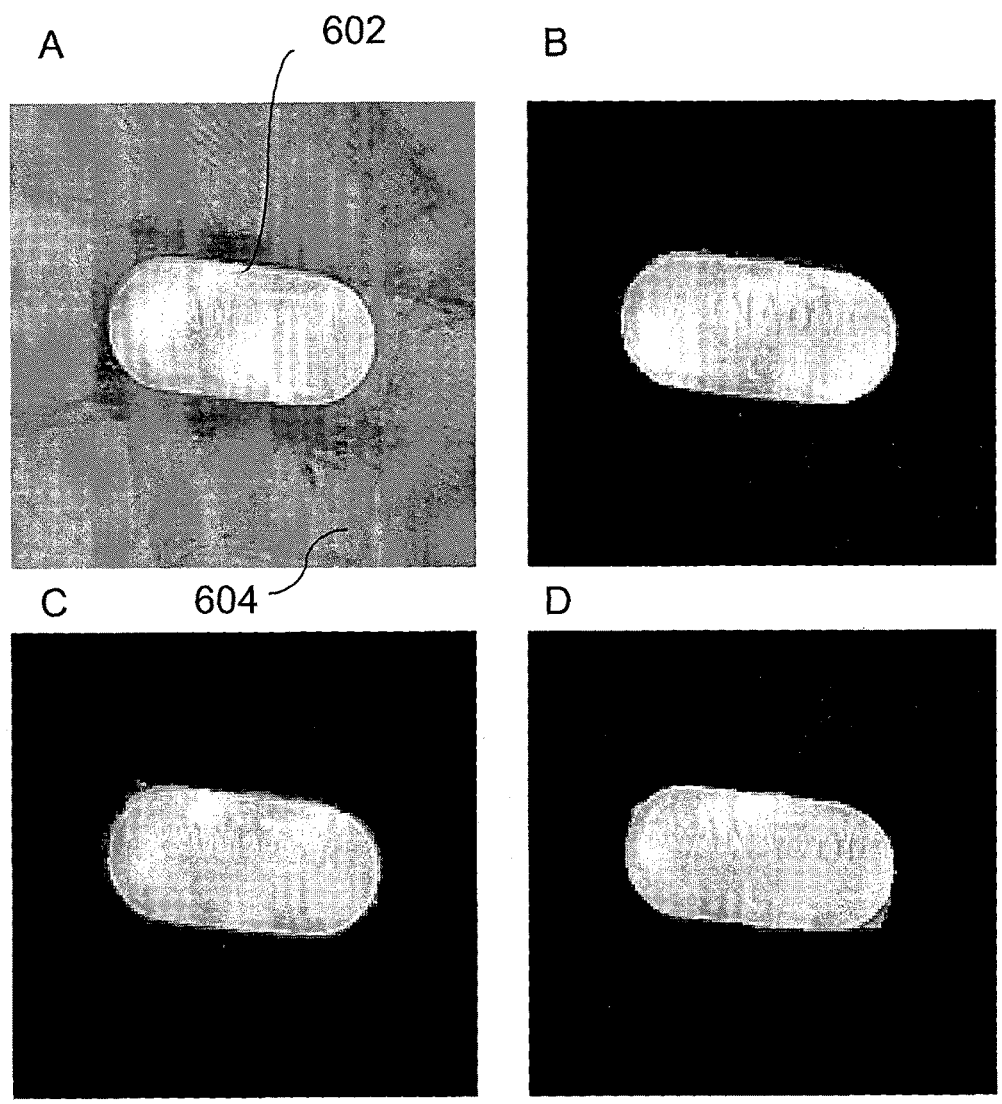
FIG. 6A shows an original image of a caplet with a palm as background.
FIG. 6B shows the segmented image (blackground component in black) after applying equation (2) according to various embodiments.
FIG. 6C shows the segmented image (blackground component in black) after applying equation (3) according to various embodiments.
FIG. 6D shows the segmented image (blackground component in black) after applying equation (4) according to various embodiments.

In general, FIGS. 4 to 6 show that the skin colour detection technique is satisfactory when the colour or colour information of the skin in the background is within the range of threshold as shown in equations (2), (3) and (4).

Most repeated colour removal/background subtraction technique as well as the skin colour detection technique generally involves identifying a range of colours such that the pixels or points having the range of colours are grouped as the background component of the segmented image and grouping the pixels or points not having the range of colours as the foreground component of the segmented image.

Another segmentation technique removes false edges uses Sobel and/or Canny edge detector. This technique may help to remove false edges such as those related to the lines of the palm. An edge may be determined by comparing a pixel and a neighboring pixel. If the colour information between the two pixels exceeds a predetermined amount, the pixel may be determined as a pixel along an edge. A true edge is one that accurately separates the object from the background while a false edge is one which does not separate the object from the background. Colour information around edges were obtained from the image. For each pixel in the edges, the most repeated hue value in the 4 squared regions around the pixel may be computed. The 4 squared regions have a length $l_h$. If the 4 values are the same, the pixel is a member of a false edge and will be ignored. This segmentation technique helps to segment the image into a segmented image by attempting to draw a perimeter including the true edges around an image.

Figure 7:
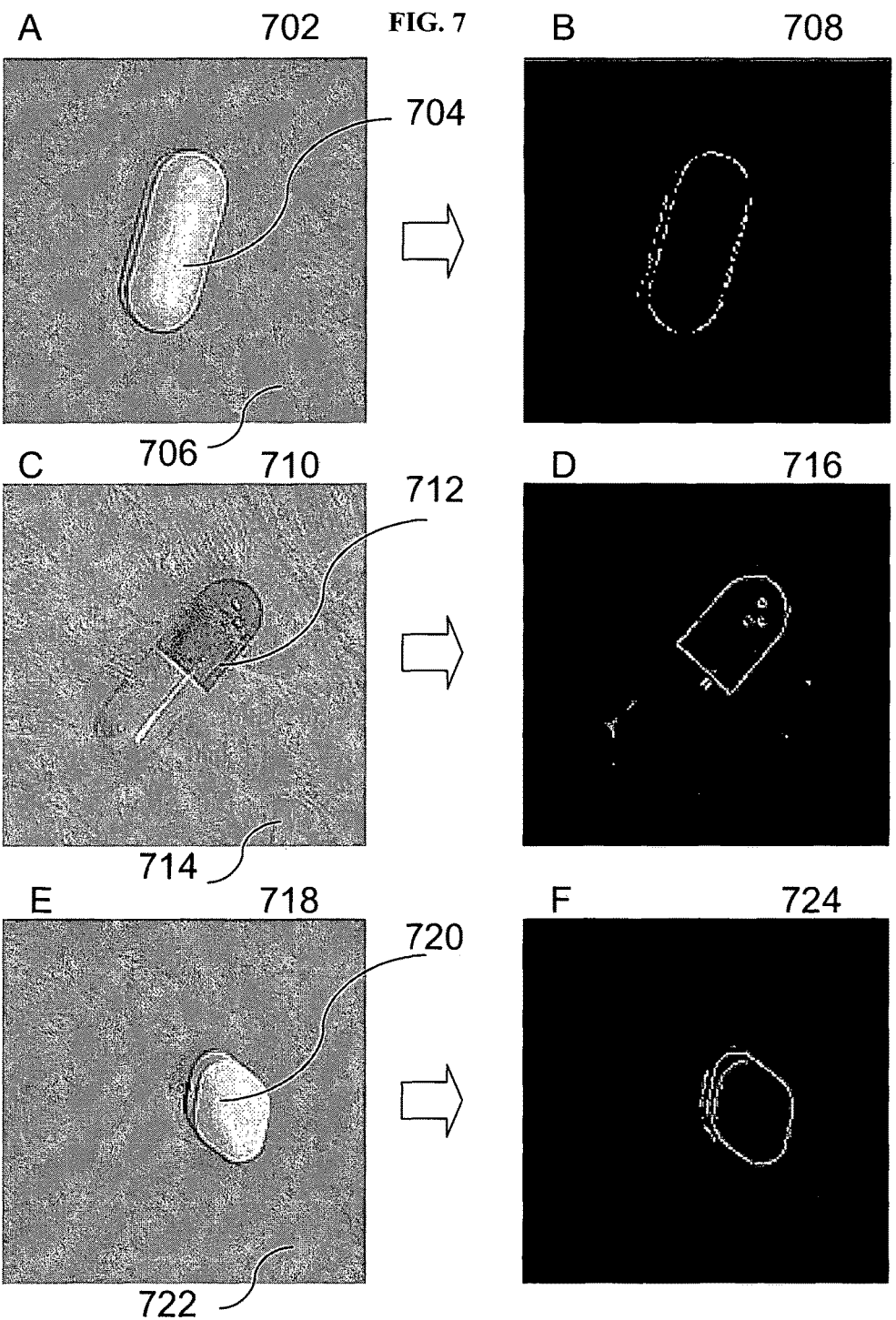
FIGS. 7A and B show an image of a caplet in front of a background before applying edge detection and after applying edge detection respectively according to various embodiments.
FIGS. 7C and D show an image of a capsule in front of a background before applying edge detection and after applying edge detection respectively according to various embodiments.
FIGS. 7E and F show an image of a pill in front of a background before applying edge detection and after applying edge detection respectively according to various embodiments.

FIGS. 7A and B show an image 702 of a caplet 704 in front of a background 706 before applying edge detection and the image 708 after applying edge detection respectively according to various embodiments. FIGS. 7C and D show an image 710 of a capsule 712 in front of a background 714 before applying edge detection and the image 716 after applying edge detection respectively according to various embodiments. FIGS. 7E and F show an image 718 of a pill 720 in front of a background 722 before applying edge detection and the image 724 after applying edge detection respectively according to various embodiments.

Another segmentation technique is K-means clustering. K-means clustering involves determining a number of colour categories in the image, grouping each pixel of the image under one of the number of colour categories based on similarities of colour of each pixel to colour of the colour categories and determining the foreground component and the background component of the image based on the grouped pixels.

An first step may involve selecting a number of points or pixels, k, in the image to represent k number of colour categories. The numerical value of k may be automatically or randomly obtained. Each point or pixel of the k number of points or pixels represent one colour category. The remaining points or pixels are then categorized under one of the k number of colour categories by determining which one of the k number of points or pixels each of the remaining points or pixels is closest to. The steps of selecting k number of points and categorizing the remaining points or pixels may be iterated several times. The most frequently occurring distribution for the several iterations may then be selected. The most common colour category, ie. the colour category in which most points are categorized under may be taken as the background component and the other colour categories may be taken as the foreground component. Alternatively, the colour categories closest to skin colours may be excluded and the remaining colour categories with the most points categorized under are taken to be the foreground component. The colour categories closest to skin colours and the remaining colour categories not categorized under the foreground component are then categorized as the background component.

Figure 8:
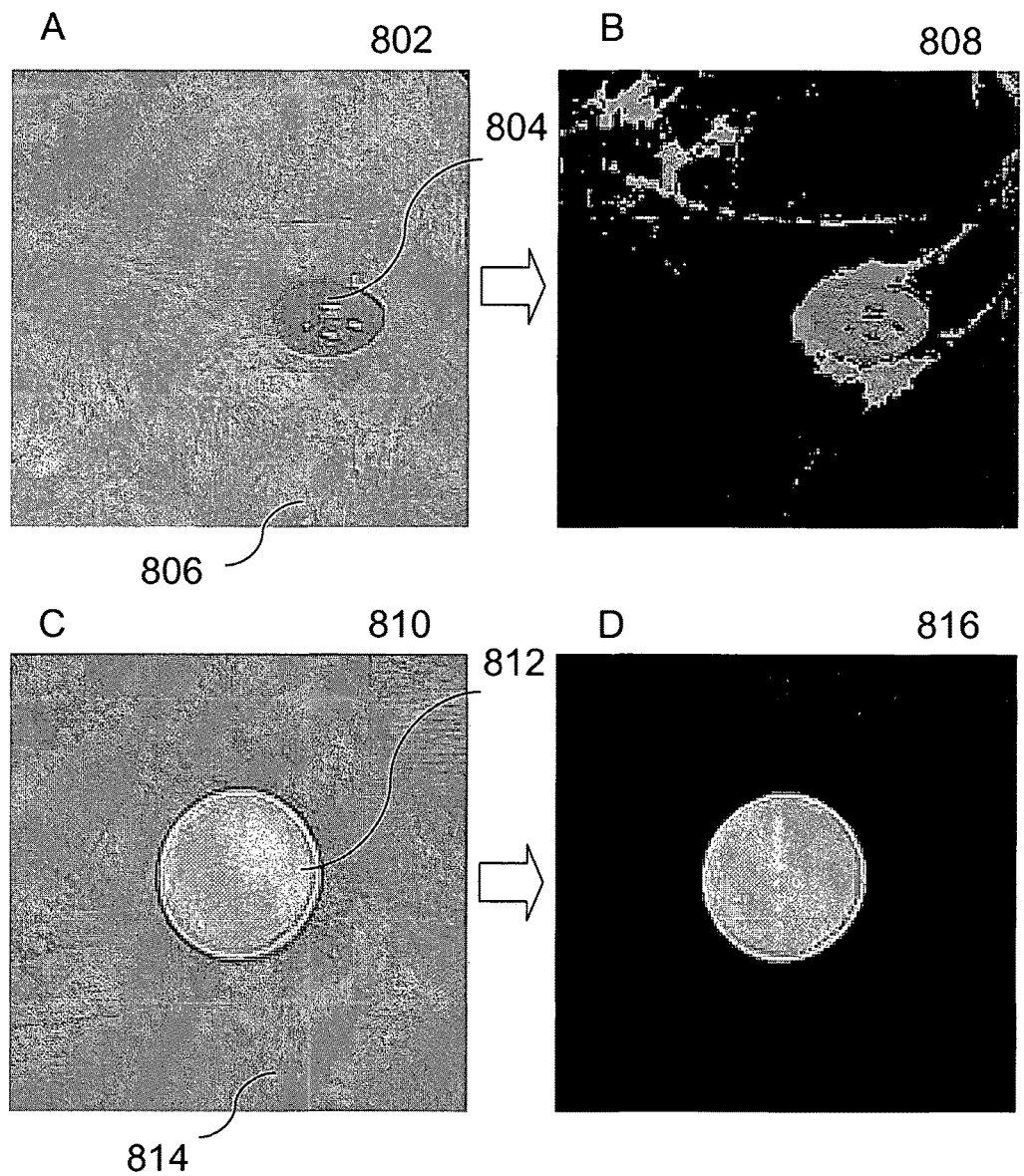
FIGS. 8A and B show an image of a pill in front of a background before applying one dimensional K-means clustering and an image after applying one dimensional K-means clustering respectively according to various embodiments.
FIGS. 8C and D show an image of a pill in front of a background before applying one dimensional K-means clustering and an image after applying one dimensional K-means clustering respectively according to various embodiments.

FIGS. 8A and B show an image 802 of a pill 804 in front of a background 806 before applying one dimensional K-means clustering and an image 808 after applying one dimensional K-means clustering respectively according to various embodiments. FIGS. 8C and D show an image 810 of a pill 812 in front of a background 814 before applying one dimensional K-means clustering and an image 816 after applying one dimensional K-means clustering respectively according to various embodiments. In FIGS. 8A to D, one dimensional K-means clustering was applied for the hue component or channel. The number of clusters, ie. the number of k points is obtained automatically from the colour histogram. The number of clusters is restricted to 4 as most of the pills have less than three principal colours. The background component is then removed to form the images 808 and 816 in FIGS. 8B and 8D.

Three dimensional K-means clustering is similar to one dimensional K-means clustering except that all colour components or channels in a colour space are involved. For instance, all three components or channels—red, green and blue in the RGB colour space are involved. Similarly, for the HSV colour system, the three components or channels of hue, saturation and value are involved.

Figure 9:
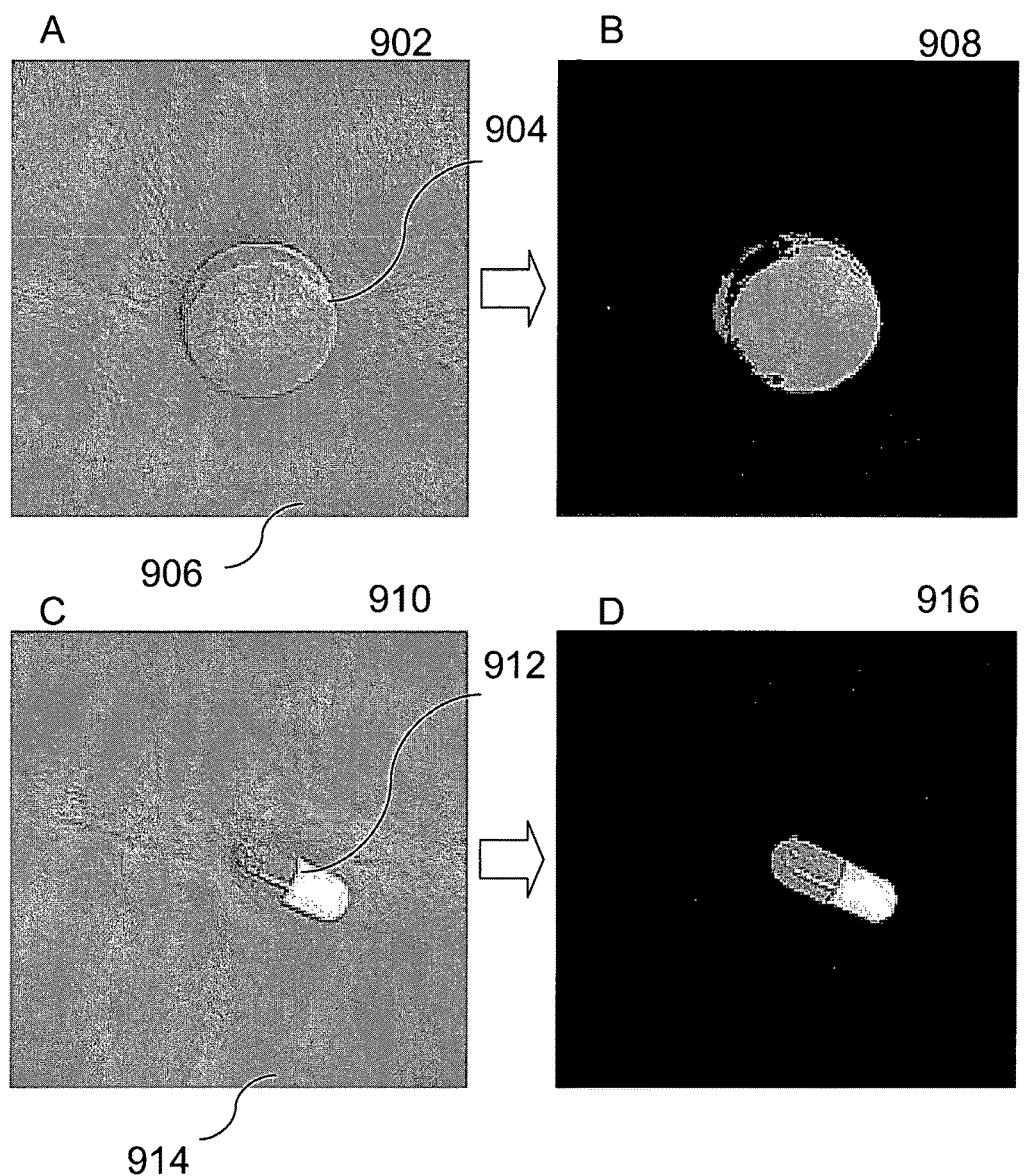
FIGS. 9A and B show an image of a tablet in front of a background before applying four dimensional K-means clustering and an image after applying one dimensional K-means clustering respectively according to various embodiments.
FIGS. 9C and D show an image of a pill in front of a background before applying one dimensional K-means clustering and an image after applying four dimensional K-means clustering respectively according to various embodiments.

In four dimensional K-means clustering, segmenting further comprises determining a center point of the image, calculating distance of each point or pixel from the center point of the image and grouping each point or pixel in the image under one of the number of colour categories further based on the distance of the point or pixel from the center point of the image. Four dimensional K-means clustering tend to cluster pixels or points which are close in proximity under one colour category. FIGS. 9A and B show an image 902 of a tablet 904 in front of a background 906 before applying four dimensional K-means clustering and an image 908 after applying one dimensional K-means clustering respectively according to various embodiments. FIGS. 9C and D show an image 910 of a pill 912 in front of a background 914 before applying one dimensional K-means clustering and an image 916 after applying four dimensional K-means clustering respectively according to various embodiments.

Four dimensional K-means clustering is more accurate than one or three dimensional K-means clustering in the segmenting of connected objects which are placed at the center of the image. As pills, tablets, capsules or caplets are connected objects and they are typically positioned at the center of the image for identification, four dimensional K-means is especially suited for such applications.

Segmenting the image may further comprise performing colour conversion on each pixel to enhance algorithm efficacy before determining the number of colour categories in the image comprising: assigning hue, saturation, and lightness for each pixel in hue, saturation, and lightness (HSL) colour space, equating value to the lightness for each pixel such that hue, saturation, and value (HSV) colour space is defined for each pixel; and transforming hue, saturation, and value (HSV) colour space to red, green, blue (RGB) colour space for each pixel. By equating value to lightness, the 'spikes' in image may be flattened and thus determining the number of colour categories in the image may be more accurate.

Alternatively, the numerical values for the red, green and blue components or channels for each pixel can be determined first. The RGB colour space can then be converted to HSL space. After that, value can be equated to lightness for each pixel such that the HSV colour space is defined for each pixel. The HSV colour space is then transformed back to the RGB colour space.

Increasing algorithm efficacy using colour conversion or other suitable methods before applying K-means clustering may further improve the accuracy of segmenting the image.

Other segmentation techniques such as mean-shift and sihoutte detection may also be used. Mean-shift is a non-parametric feature-space analysis technique and is a mode seeking algorithm. Sihoutte detection requires the input image to be binary, similar to providing or generating an edge map. In cases where the background of the pill is homogeneous, uniform or smooth, the segmentation results are acceptable. However, if the background is non-uniform, such as a human palm or fingers, which naturally contains deep ridge lines, bumps, undulating surface or markings on the palm, the edge mapping would have a problem defining edges correctly, where such lines or markings would appear as edges also in the edge map.

In various embodiments, the image is further segmented using further segmentation techniques to produce a plurality of images, and choosing one or more segmented images from the plurality of images for determining the at least one property of the foreground component.

In other words, different segmented images can be formed from an image using different or same or a combination of same and different segmentation techniques. Different variations of the same segmentation technique can also be employed. One or more segmentation images is then selected from the plurality of images for determining the at least one property of the foreground.

Different segmentation techniques are suitable for imaging different object or the same object under different conditions. However, it may be difficult to foresee which segmentation techniques are suitable. Advantageously, forming a plurality of segmented images and choosing one or more segmented images from the plurality of segmented images may result in producing better or more suitable segmented images for further processing to identify the object.

Figure 10:
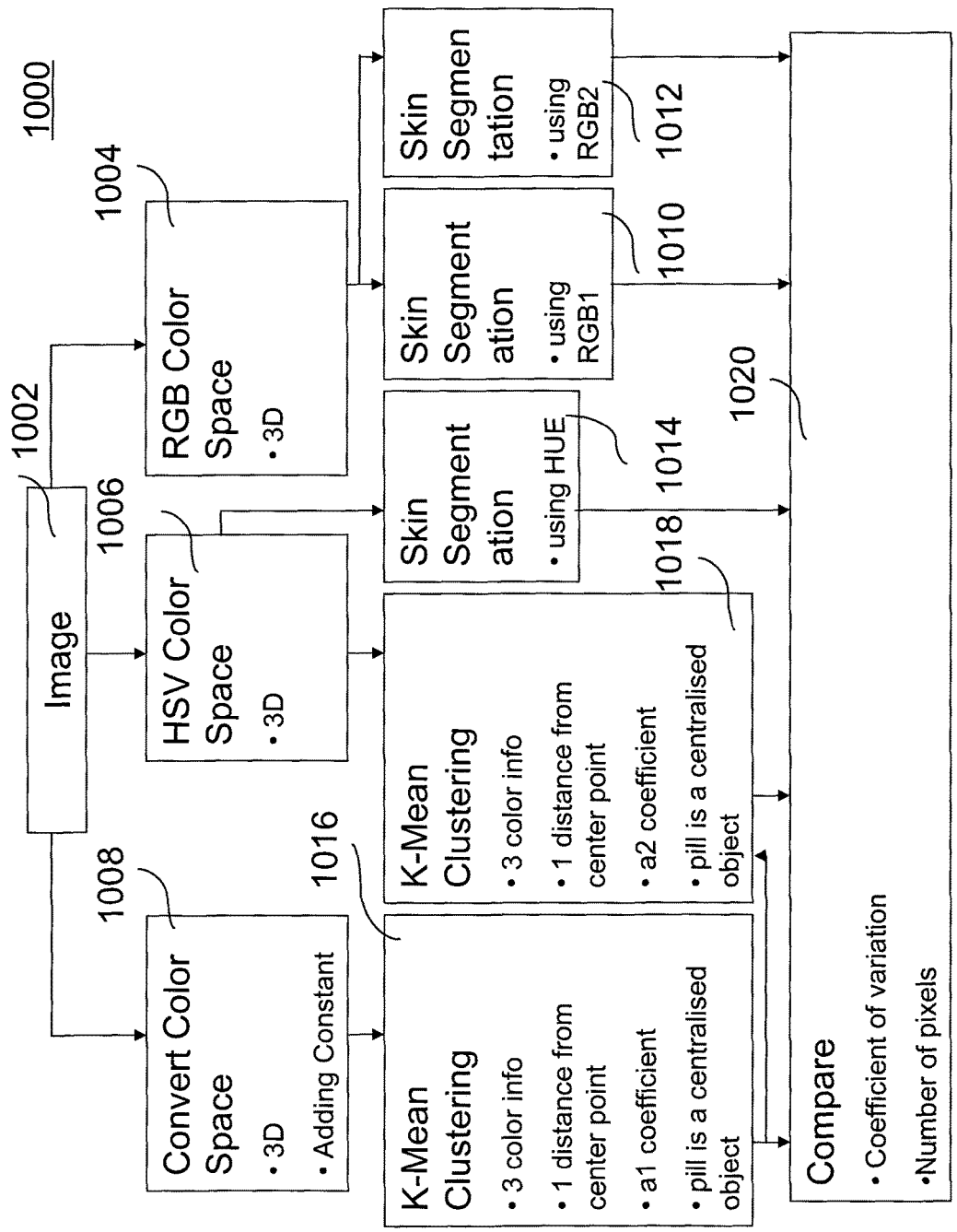
FIG. 10 shows a diagram illustrating segmenting the image to form a plurality of segmented images using different segmentation techniques and choosing one or more of the plurality of images.
Figure 11:
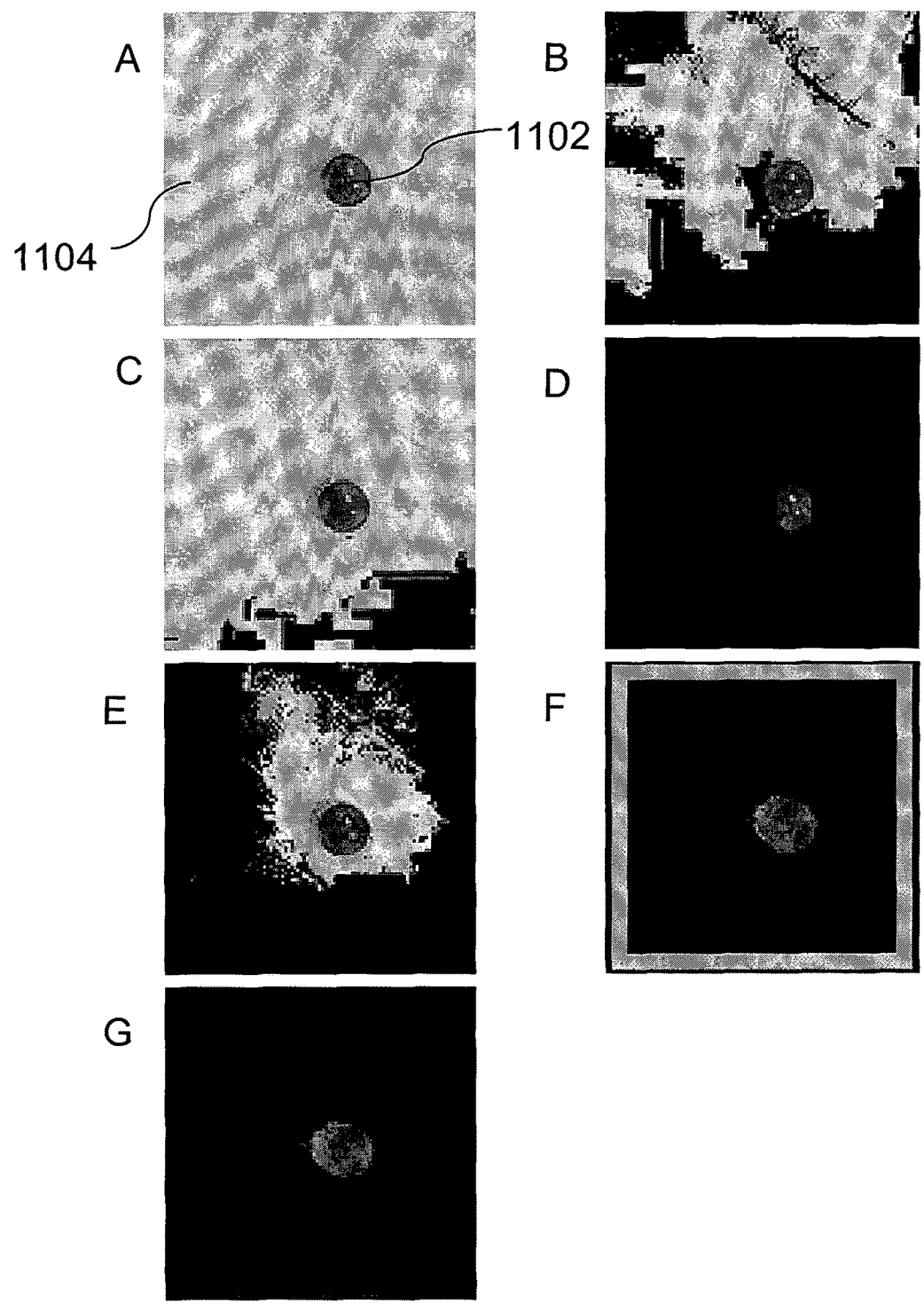
FIG. 11A shows an original image of a pill in front of a background.
FIG. 11B shows the image in FIG. 11A after a first skin segmentation technique according to various embodiments using equation 2 is applied.
FIG. 11C shows the image in FIG. 11A after a second skin segmentation technique according to various embodiments using equation 3 is applied.
FIG. 11D shows the image in FIG. 11A after a third skin segmentation technique according to various embodiments using equation 4 is applied.
FIG. 11E shows the image in FIG. 11A after a first four dimensional K-means clustering technique according to various embodiments is applied.
FIG. 11F shows the image in FIG. 11A after a second four dimensional K-means clustering technique according to various embodiments is applied.
FIG. 11G shows the image chosen.
Figure 12:
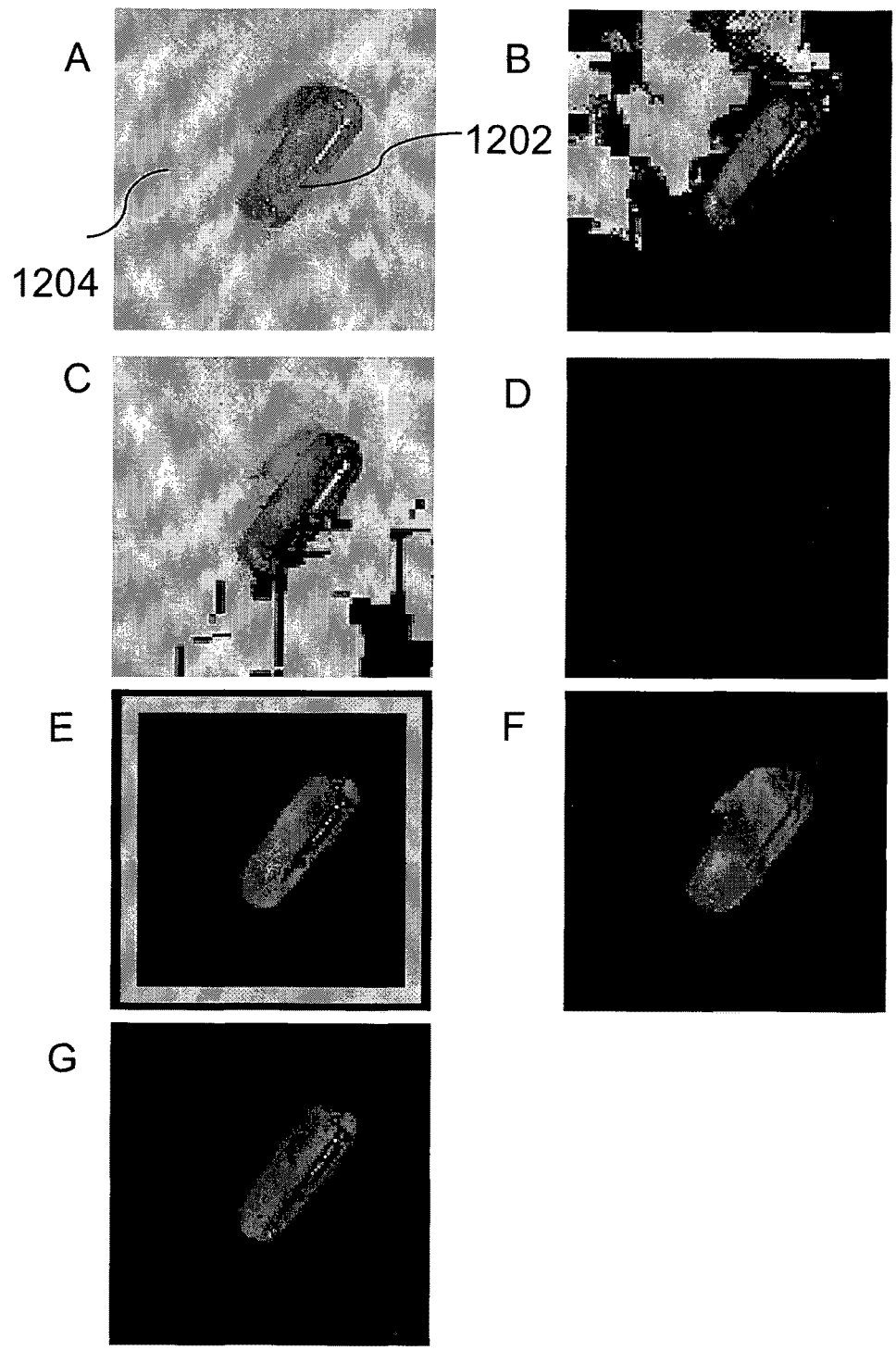
FIG. 12A shows an original image of a capsule in front of a background.
FIG. 12B shows the image in FIG. 12A after a first skin segmentation technique according to various embodiments using equation 2 is applied.
FIG. 12C shows the image in FIG. 12A after a second skin segmentation technique according to various embodiments using equation 3 is applied.
FIG. 12D shows the image in FIG. 12A after a third skin segmentation technique according to various embodiments using equation 4 is applied.
FIG. 12E shows the image in FIG. 12A after a first four dimensional K-means clustering technique according to various embodiments is applied.
FIG. 12F shows the image in FIG. 12A after a second four dimensional K-means clustering technique according to various embodiments is applied.
FIG. 12G shows the image chosen.
Figure 13:
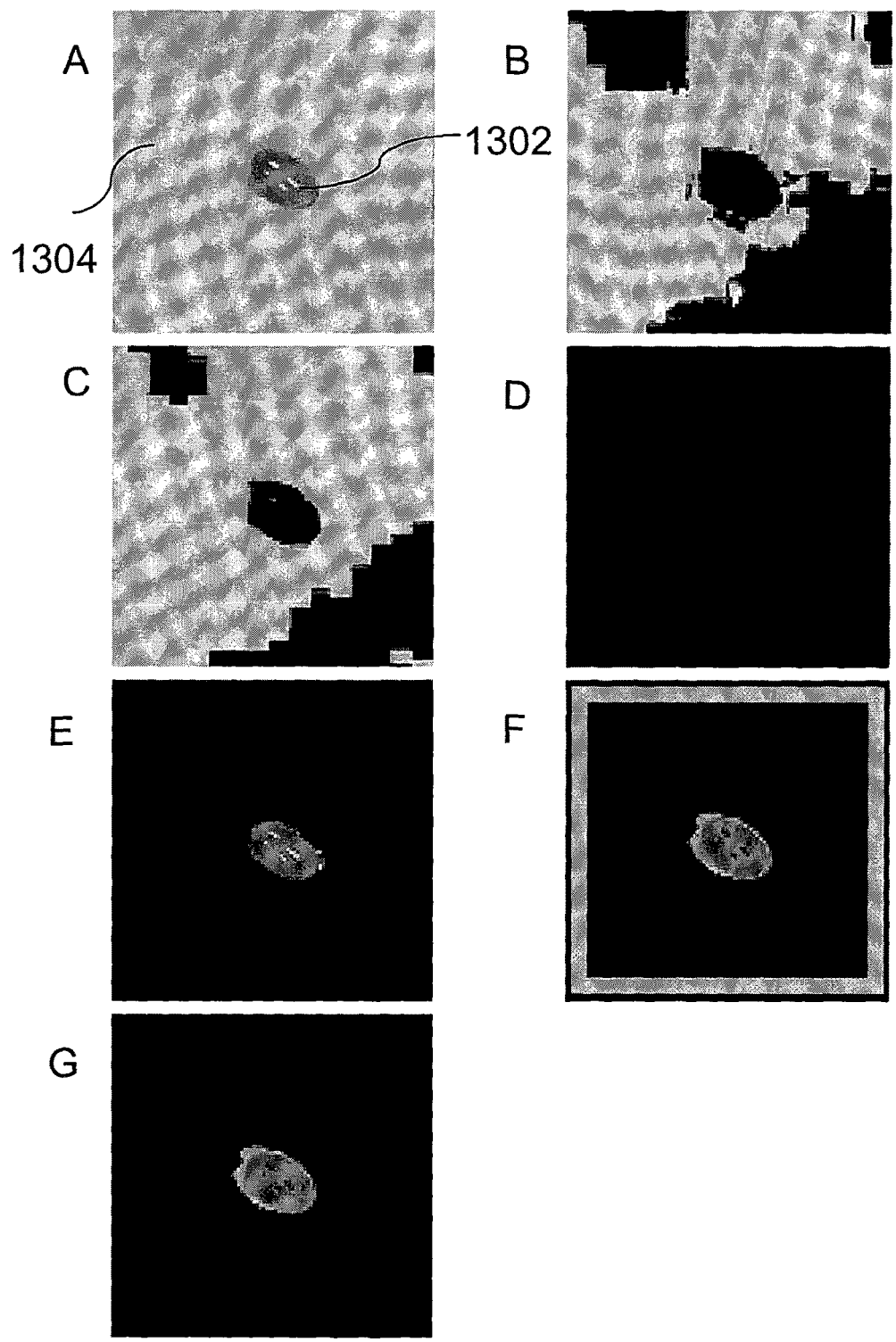
FIG. 13A shows an original image of a pill in front of a background.
FIG. 13B shows the image in FIG. 13A after a first skin segmentation technique according to various embodiments using equation 2 is applied.
FIG. 13C shows the image in FIG. 13A after a second skin segmentation technique according to various embodiments using equation 3 is applied.
FIG. 13D shows the image in FIG. 13A after a third skin segmentation technique according to various embodiments using equation 4 is applied.
FIG. 13E shows the image in FIG. 13A after a first four dimensional K-means clustering technique according to various embodiments is applied.
FIG. 13F shows the image in FIG. 13A after a second four dimensional K-means clustering technique according to various embodiments is applied.
FIG. 13G shows the image chosen.
Figure 14:
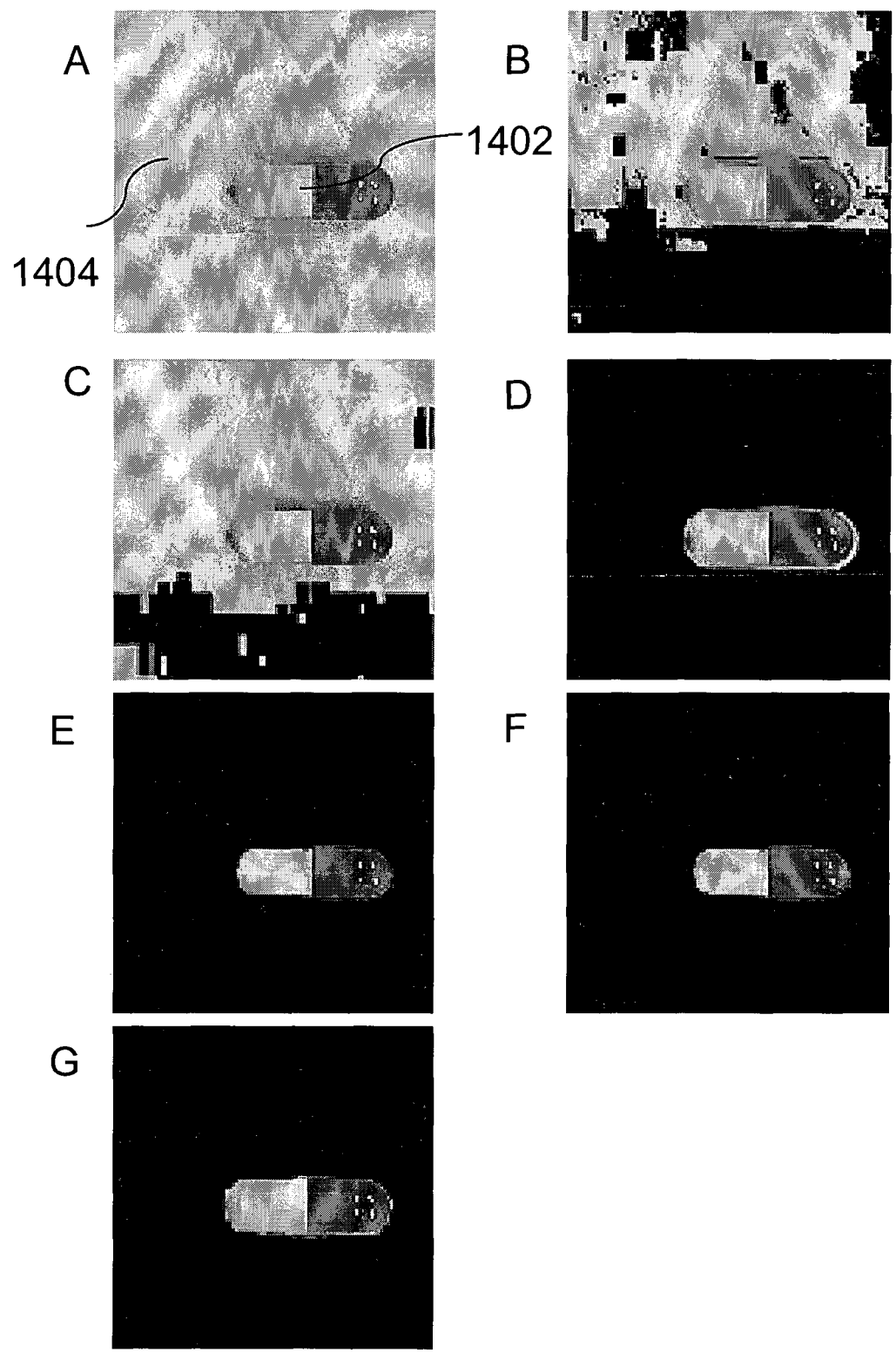
FIG. 14A shows an original image of a capsule in front of a background.
FIG. 14B shows the image in FIG. 14A after a first skin segmentation technique according to various embodiments using equation 2 is applied.
FIG. 14C shows the image in FIG. 14A after a second skin segmentation technique according to various embodiments using equation 3 is applied.
FIG. 14D shows the image in FIG. 14A after a third skin segmentation technique according to various embodiments using equation 4 is applied.
FIG. 14E shows the image in FIG. 14A after a first four dimensional K-means clustering technique according to various embodiments is applied.
FIG. 14F shows the image in FIG. 14A after a second four dimensional K-means clustering technique according to various embodiments is applied.
FIG. 14G shows the image chosen.

FIG. 10 shows a diagram illustrating segmenting the image 1002 to form a plurality of segmented images using different segmentation techniques 1010, 1012, 1014, 1016 and 1018 and choosing one or more of the plurality of images. In 1010 and 1012, a first and a second skin segmentation technique employing equations 2 and 3 respectively under RGB colour space 1004 are utilized. In 1014, a third skin segmentation technique employing equation 4 under HSV colour space 1006 is utilized. In 1016, a first four dimensional K-means clustering technique is employed in RGB colour space after using the colour conversion technique highlighted earlier in 1008. In 1018, a second four dimensional K-means clustering technique is applied in HSV colour space. Information on the distance of each pixel from the center point of the image is obtained from the first four dimensional K-means clustering technique in 1016. a1 and a2 under 1016 and 1018 respectively of FIG. 10 are arbitrary, predefined constants.

In various embodiments, the segmented image is a binary image having a first colour and a second colour, the first colour for identifying the foreground component and the second colour for identifying the background component.

After a plurality of segmented images are obtained, one or more of the segmented images may be chosen from the plurality of segmented images indicated by 1020. The choosing of the one or more of the segmented images may be done by a processor or computer. In various embodiments, this may be done on the same processor or computer segmenting the image and/or determining the at least one property of the segmented image. The choosing of one or more of the segmented images from the plurality of segmented images may be carried out using measuring the coefficient of variation ($C_V$). This involves determining a center point of the foreground component in each segmented image, calculating a coefficient of variation for each segmented image based on the distance of pixels belonging to the foreground component from the center point of the foreground component in the segmented image and determining whether the coefficient of variation of each segmented image falls below a predetermined value. The centre point of the foreground component may be the geometrical centroid of the foreground component.

The coefficient of variation is a normalized measure of dispersion using a probability distribution.

$$C_V = \frac{\sigma}{\mu} \tag{5}$$

$\mu$ is the mean of distances of pixels in the foreground component from the center point of the foreground component in each segmented image. $\sigma$ is the standard variation of distances of pixels in the foreground component from the center point of the foreground component in each segmented image.

The coefficient of variation measures variation in a property such as distance of the foreground component. Images of compact objects such as pills, tablets, capsules and caplets usually have a relatively fixed range of coefficient of variation. For an object such as a pill, the coefficient of variation is usually less than 0.3. In various embodiments, only segmented images with foreground components having a coefficient of variation below a predetermined value are selected while segmented images with foreground components having a coefficient of variation more than the predetermined value are rejected.

In various embodiments, choosing the one or more segmented image from the plurality of segmented images includes determining number of pixels belonging to the foreground component in each segmented image, and determining whether the number of pixels belonging to the foreground component in each segmented image falls within a predetermined range of values. One or more of the segmented images may be chosen from the plurality of segmented images may be carried out by measuring the amount of pixels in the foreground component. Images of objects such as pills, tablets, capsules and caplets usually have a relatively fixed range of pixels for the foreground component. In various embodiments, only segmented images with foreground components having a number of pixels below a predetermined value or within a predetermined range is selected.

In various embodiments, the choosing of one or more of the segmented images may be chosen from the plurality of segmented images may be carried out by more than one technique or a combination of techniques. For instance, the choosing of one or more of the segmented images may be chosen from the plurality of segmented images may be carried out based on both coefficient of variation and number of pixels. The choosing of one or more of the segmented images may be based on that chosen segmented images fulfills the criteria of one or both techniques. Alternatively, the plurality of segmented images may be ranked using one or both techniques and the highest ranked segmented images are selected.

42 sets of results were obtained from 42 objects based on the methods or techniques shown in FIG. 10. One of the segmentation techniques shown in FIG. 10 were found to be able to produce ideal segmented images in 41 sets of results. 4 sets of the results are shown in FIG. 11 to FIG. 14.

FIG. 11A shows an original image of a pill 1102 in front of a background 1104. FIG. 11B shows the image in FIG. 11A after a first skin segmentation technique according to various embodiments using equation 2 is applied. FIG. 11C shows the image in FIG. 11A after a second skin segmentation technique according to various embodiments using equation 3 is applied. FIG. 11D shows the image in FIG. 11A after a third skin segmentation technique according to various embodiments using equation 4 is applied. FIG. 11E shows the image in FIG. 11A after a first four dimensional K-means clustering technique according to various embodiments is applied. FIG. 11F shows the image in FIG. 11A after a second four dimensional K-means clustering technique according to various embodiments is applied. FIG. 11G shows the chosen foreground image from FIG. 11F in RGB colour space.

FIG. 12A shows an original image of a capsule 1202 in front of a background 1204. FIG. 12B shows the image in FIG. 12A after a first skin segmentation technique according to various embodiments using equation 2 is applied. FIG. 12C shows the image in FIG. 12A after a second skin segmentation technique according to various embodiments using equation 3 is applied. FIG. 12D shows the image in FIG. 12A after a third skin segmentation technique according to various embodiments using equation 4 is applied. FIG. 12E shows the image in FIG. 12A after a first four dimensional K-means clustering technique according to various embodiments is applied. FIG. 12F shows the image in FIG. 12A after a second four dimensional K-means clustering technique according to various embodiments is applied. FIG. 12G shows the chosen foreground image from FIG. 12E in RGB colour space.

FIG. 13A shows an original image of a pill 1302 in front of a background 1304. FIG. 13B shows the image in FIG. 13A after a first skin segmentation technique according to various embodiments using equation 2 is applied. FIG. 13C shows the image in FIG. 13A after a second skin segmentation technique according to various embodiments using equation 3 is applied. FIG. 13D shows the image in FIG. 13A after a third skin segmentation technique according to various embodiments using equation 4 is applied. FIG. 13E shows the image in FIG. 13A after a first four dimensional K-means clustering technique according to various embodiments is applied. FIG. 13F shows the image in FIG. 13A after a second four dimensional K-means clustering technique according to various embodiments is applied. FIG. 13G shows the chosen foreground image from FIG. 13F in RGB colour space.

FIG. 14A shows an original image of a capsule 1402 in front of a background 1404. FIG. 14B shows the image in FIG. 14A after a first skin segmentation technique according to various embodiments using equation 2 is applied. FIG. 14C shows the image in FIG. 14A after a second skin segmentation technique according to various embodiments using equation 3 is applied. FIG. 14D shows the image in FIG. 14A after a third skin segmentation technique according to various embodiments using equation 4 is applied. FIG. 14E shows the image in FIG. 14A after a first four dimensional K-means clustering technique according to various embodiments is applied. FIG. 14F shows the image in FIG. 14A after a second four dimensional K-means clustering technique according to various embodiments is applied. FIG. 14G shows the chosen foreground image from FIG. 14F in RGB colour space.

In various embodiments, interactive segmentation such as grab-cut involving a user's intervention may be used instead of automatic segmentation. Automatic segmentation refers to segmenting the image having the image as the only input. No further inputs from the user are required. Interactive segmentation requires the user to input further information to the image or with the image to indicate which areas of the image falls under the foreground or background component in the segmented image. Our results indicate that automatic segmentation techniques are able to achieve about 98% accuracy, which is comparable to the accuracy of interactive segmentation. In certain cases, automatic segmentation are able to achieve better results than interactive segmentation. Advantageously, automatic segmentation offers more convenience for the user as the user do not have to make further inputs to the image or supply further inputs with the image.

Figure 15:
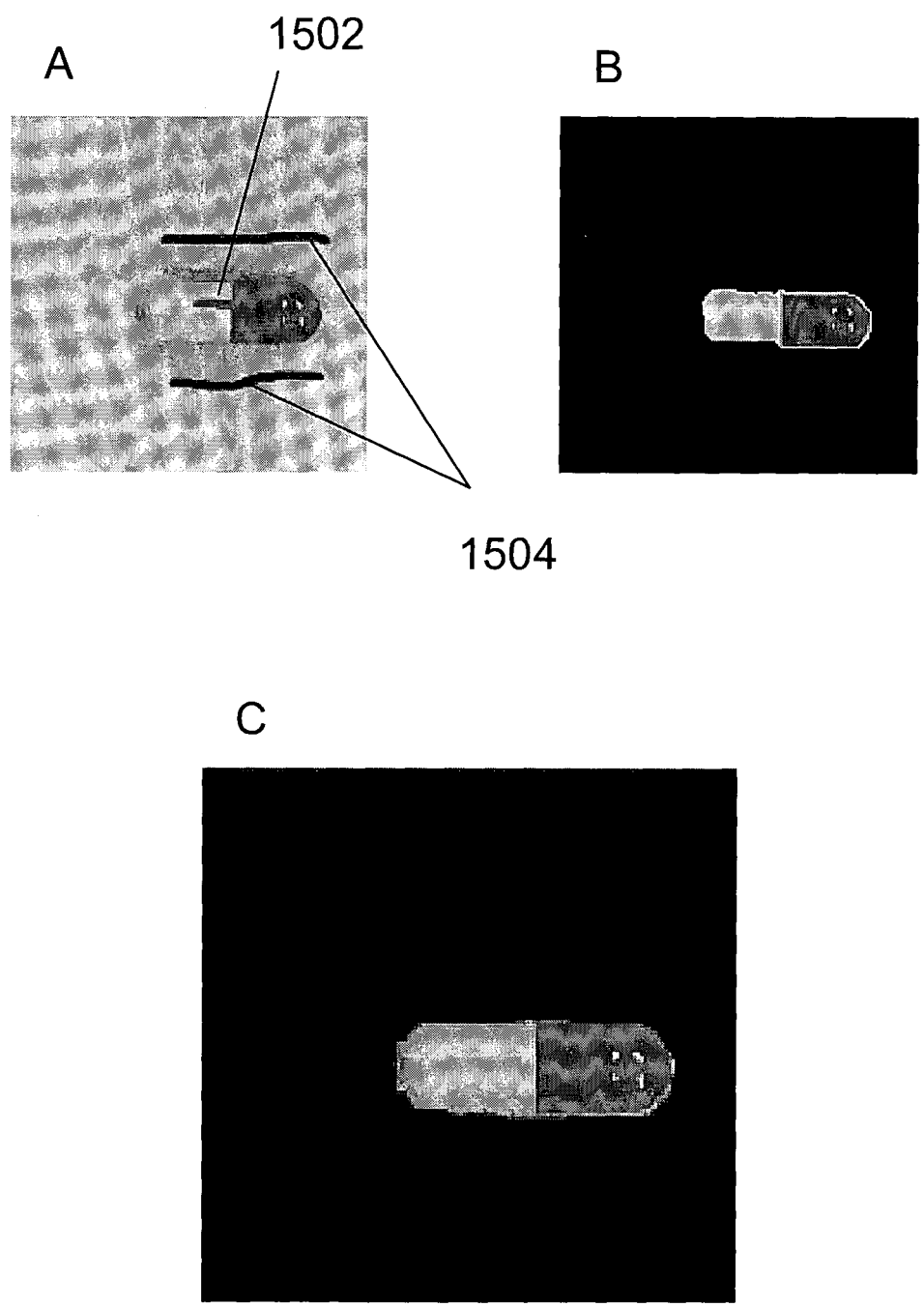
FIG. 15A shows an image of an object in front of a background for interactive segmentation.
FIG. 15B shows the segmented image using interactive segmentation.
FIG. 15C shows the segmented image after applying automatic segmentation.

FIG. 15A shows an image of an object in front of a background for interactive segmentation. The user indicates using markings 1502 and 1504 to define the areas to be segmented. Markings 1502 may be of a different colour to that of markings 1504 to indicate the foreground component and the background component respectively. FIG. 15B shows the segmented image using interactive segmentation. FIG. 15C shows the segmented image after applying automatic segmentation. FIG. 15C is the same image as FIG. 14G and shows the segmented image after applying automatic segmentation. Comparing FIGS. 15B and 15C, the image in FIG. 15C is better segmented.

In various embodiments, determining the at least one property of the foreground component includes identifying a contour of the foreground component. A Canny edge detector may be applied to the segmented image to remove false edges and/or edges that are less important. A Sobel edge detector may be used with the Canny edge detector to detect the true edges of the image. The Sobel detector uses an upper threshold and a lower threshold, to determine which edges are more important. If a pixel has a gradient with a neighbouring pixel larger than the upper threshold, then it is accepted as an edge pixel; if a pixel has a gradient with a neighbouring pixel below the lower threshold, it is rejected.

If the gradient of the pixel formed with a neighboring pixel is between the upper threshold and the lower threshold, then it will be accepted only if it is connected to a pixel that is above the high threshold. In various embodiments, the lower threshold may be set to about 90, and the higher threshold may be set to about 150. It is found that setting such values for the higher and lower threshold are particularly suitable for imaging objects such as pills in front of a background of a human palm.

In various embodiments, determining the at least one property of the foreground component may include identifying a minimum area bounding the contour of the foreground component in the form of a bounding box and identifying at least one critical feature of the bounding box, wherein the at least one property of the foreground component includes the at least one critical feature.

Figure 16:
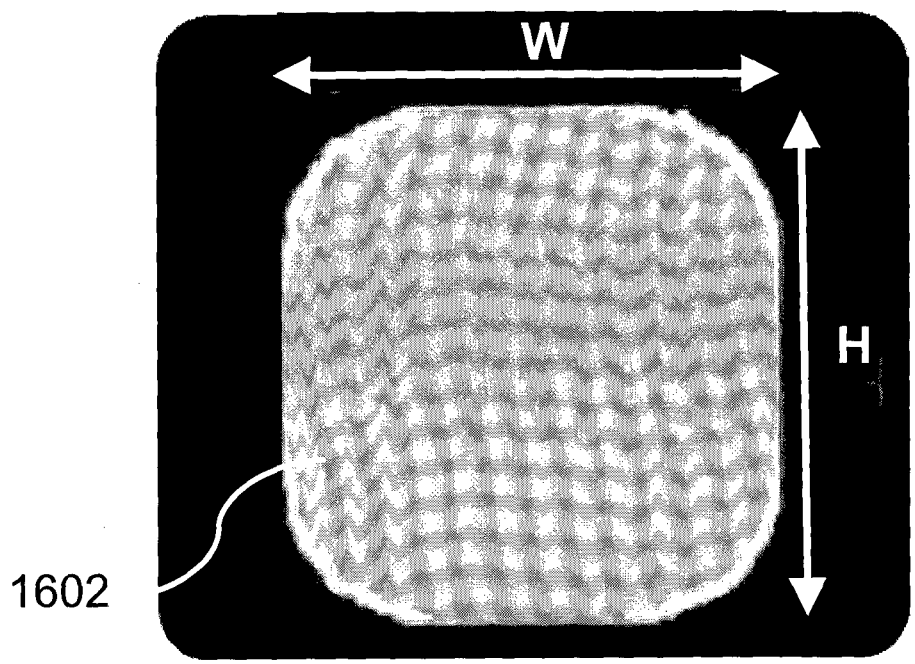
FIG. 16 shows an image of a tablet in which the width and the height of the bounding box are measured according to various embodiments.

The critical feature may be the ratio of the height to the width of the bounding box or the ratio of the width to the height of the bounding box. FIG. 16 shows an image of a tablet 1602 in which the width and the height of the bounding box are measured according to various embodiments.

Figure 17:
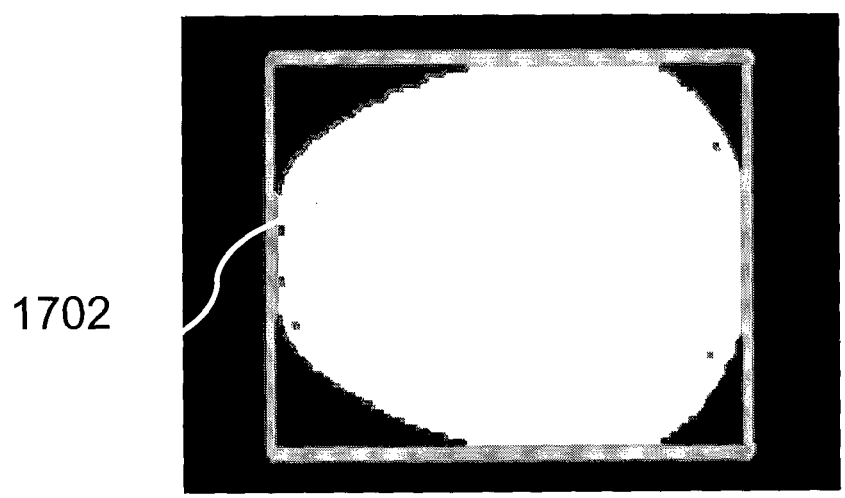
FIG. 17 illustrates measuring the rectangularity of a pill according to various embodiments.

The critical feature may also be the rectangularity of the object. In other words, the critical feature is the degree which the object conforms to a rectangular shape or the degree the object fills the bounding box. The ratio of the area bound by the contour of the foreground component to the area of the bounding box is measured. The value of this critical feature may vary from 0 to 1, where 1 represents the rectangle defined by the entire bounding box. FIG. 17 illustrates measuring the rectangularity of a pill 1702 according to various embodiments.

The critical feature may also be the ratio of the height to the width of the bounding box rotated 45 clockwise or anticlockwise or the ratio of the width to the height of the bounding box rotated 45° clockwise or anticlockwise. FIG. 18 shows an image of a tablet 1802 in which the width and the height of the bounding box rotated clockwise or anticlockwise are measured according to various embodiments.

In various embodiments, determining the at least one property of the foreground component may include identifying at least one critical feature of the contour of the foreground component, wherein the at least one property of the foreground component includes the at least one critical feature.

The critical feature may be the position of points along the contour of the foreground component in a predefined grid.

The critical feature may be the circularity of the shape of the foreground component. This may be determined by calculating the ratio of the square of the perimeter defined by the contour to the area bound by the contour.

Other critical features may be identified. In general, critical features may be identified such that their values differ widely if the shapes, colours or another property of the foreground component are not alike.

In various embodiments, determining the at least one property of the foreground component may include identifying a plurality of points along the contour of the foreground component and selecting a shape out a plurality of predefined shapes based on the plurality of points, wherein the at least one property of the foreground component includes the shape selected based on the plurality of points.

In other words, points along the contour of the foreground component are identified and depending on the locations of the points, a suitable shape is identified. The identified shape may then be compared with shapes of identified objects stored in the database or shapes drawn from images of identified objects stored in the database.

It may be desirable to reduce the number of points along the contour line, especially when removing the points does not affect the shape identified or selected. In other words, the shape identified or selected based on the reduced plurality of points is the same or substantially the same as the shape identified or selected based on the original plurality of points. Reducing the number of points may reduce the computation power in further steps. The reduced number of points may also make it easier to form a more regular shape and thus help to match the shape of the foreground component with shapes of identified objects in the database subsequently. FIG. 19A shows various shapes, each shape formed by an original plurality of points according to various embodiments. FIG. 19B shows various shapes, each shape formed by a reduced plurality of points according to various embodiments. The shapes in 19A and 19B are substantially the same but the number of points are now reduced. For instance, point 1902 is removed in FIG. 19B.

In various embodiments, determining the at least one property of the foreground component may include reducing the plurality of points identified including selecting a point, identifying a first neighboring point nearest the selected point, identifying a second neighboring point the second next nearest the selected point, determining an angle between a first line drawn between the selected point and the first neighboring point and a second line drawn between the selected point and the second neighbouring point and removing the selected point if the angle exceeds a predetermined value.

Figure 20:
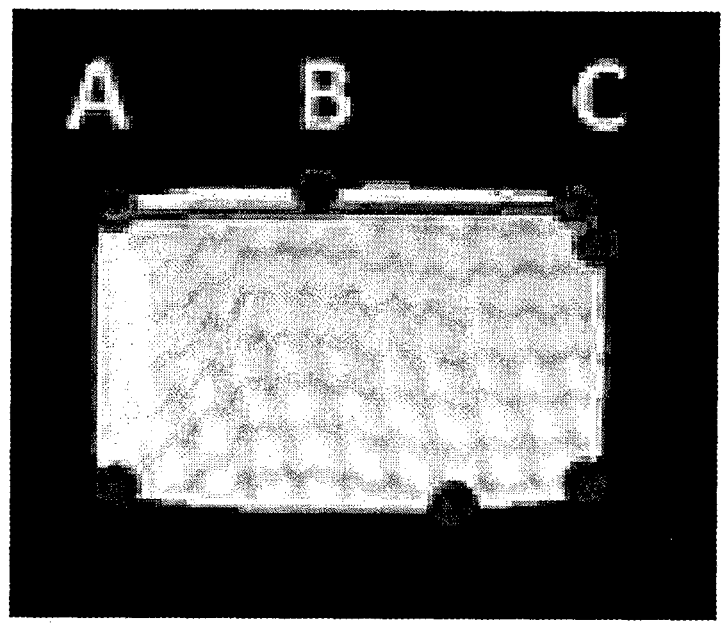
FIG. 20 is a diagram illustrating a technique to reduce the number of points identified according to various embodiments.

FIG. 20 is a diagram illustrating a technique to reduce the number of points identified according to various embodiments. Three points A, B and C are consecutive points forming vertices of a polygon. Point B is selected and considered to be removed. Point A and C are identified as the first neighbouring point and the second neighbouring point respectively. An angle between a first line drawn between the selected Point B and the first neighboring Point A and a second line drawn between the selected Point B and the second neighbouring point Point C. The angle between the first and second lines is measured and then compared to a predetermined value. If it is smaller than the predetermined value, Point B is removed.

In various embodiments, determining the at least one property of the foreground component includes reducing the plurality of points identified including selecting a first point, selecting a second point, identifying a bounding box such that the first point falls on a first corner of the bounding box and the second point falls on a second corner of the bounding box diagonally opposite the bounding box from the first corner, the bounding box having a width and a height, determining a threshold of the bounding box based on the width and the height and removing the second point if the threshold falls below a predetermined value.

Figure 21:
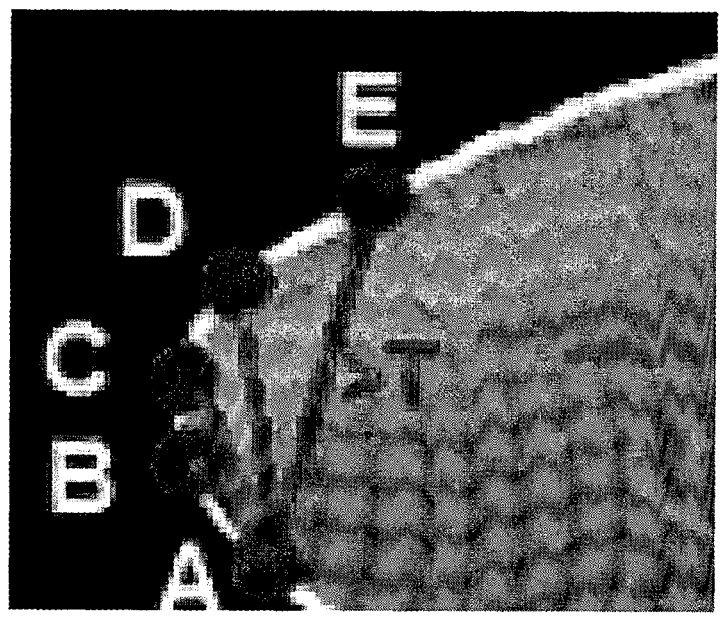
FIG. 21 is a diagram illustrating another technique to reduce the number of points identified according to various embodiments.

FIG. 21 is a diagram illustrating another technique to reduce the number of points identified according to various embodiments. A first Point A is first selected. A second Point B is then selected. A bounding box is then identified such that the first Point A falls on a first corner of the bounding box and the second Point B falls on a second corner of the bounding box diagonally opposite the bounding box from the first corner. The threshold T may be determined using the formula $$T = \sqrt{\left(\frac{W}{div}\right)^2 + \left(\frac{H}{div}\right)^2} \qquad (6)$$

W and H are the width and height of the bounding box respectively and div is a predefined constant.

In the event that the value T is smaller than a predetermined value, second Point B is removed. Subsequent second points C, D, E are then considered one after another.

In various embodiments, matching the at least one property of the foreground component with a database of identified objects includes determining the shape selected based on a plurality of points of each identified object and determining the closeness of the shape selected based on a plurality of points of the foreground component with the corresponding shape of each identified object. In various embodiments, matching the at least one property of the foreground component with a database of identified objects includes determining the closeness of the shape selected based on a plurality of points of the foreground component with the corresponding shape of identified objects which are already stored in the database.

In various embodiments, the database images are ranked according to the degree of closeness with the shape selected based on a plurality of points of the object and the database image having a corresponding shape with the highest degree of closeness with the shape of the object is then matched with the object.

In various embodiments, matching the at least one property of the foreground component includes rating similarity between the shape of the foreground component based on the plurality of points and an identified object in the database by forming a first polygon having a first number of vertices formed from the shape of the foreground component and a second polygon having a second number of vertices derived from the identified object in the database, determining whether the first number of vertices is equal to the second number of vertices; removing a vertex from the polygon having a greater number of vertices and changing an index if the first number of vertices is not equal to the second number of vertices, reiterating comparison between the polygonal with reduced vertices and the remaining polygonal and changing the index until the first number of vertices is equal to the second number of vertices, determining whether the first polygon is similar to the second polygon if the first number of vertices is equal to the second number of vertices, removing a vertex from both the first polygon and the second polygon and changing the index if the first polygon is not similar to the second polygon but the first number of vertices is equal to the second number of vertices, assigning the index to the identified object if the first polygon is similar to the second polygon and the first number of vertices is equal to the second number of vertices; and reiterating comparison between polygonals with removed vertices and changing the index until the index is assigned, wherein the index indicates similarity between the shape of the foreground component and the identified objects, repeating rating similarity between the shape of the foreground component and subsequent identified objects in the database and matching the foreground component to the identified object in the database having the highest index. In various embodiments, the index is first set to 1 before rating.

"Similar" means that the two polygonal are identical after a number of scaling, rotation and translation. Assuming that the vertices of the polygons P and Q are represented by P[0],P[2], ..., P[N−1] and Q[0],Q[2], ..., Q[N−1] respectively, where N is the total number of vertices in P or Q.

For each i, a polygon $Q^i$ can be defined as follows:

$$\forall j\, Q^i[j] = Q[(i+j) \bmod N] \qquad (7)$$

j is an index indicating the vertices in polygon Q where Q[0],Q[2], ..., Q[j], ... Q[N−1].

$Q^i$ is a polygon formed by a rotation of the original polygon Q.

If $\vec{e}$ is defined as a vector joining vertices P[j] and P[j+1] or P[N−1] and P[0] and $\vec{f}$ is defined as a vector joining vertices Q[j] and Q[j+1] or Q[N−1] and Q[0], ie $$\forall j\, 0 \le j < N-1:\ \vec{e} = \overrightarrow{P[j+1]} - \overrightarrow{P[j]}\ \vec{e}_{N-1} = \overrightarrow{P[0]} - \overrightarrow{P[N-1]} \qquad (8)$$

$$\forall j\, 0 \le j < N-1:\ \vec{f}^i_j = \overrightarrow{Q^i[j+1]} - \overrightarrow{Q^i[j]}\ \vec{f}^i_{N-1} = \overrightarrow{Q^i[0]} - \overrightarrow{Q^i[N-1]} \qquad (9)$$

P and $Q^i$ may be taken to be similar if $$\text{Scale\_Similarity}_i \le S_{Threshold} \text{ and} \qquad (10)$$

$$\text{Angle\_Similarity}_i \le A_{Threshold} \qquad (11)$$

where $S_{Threshold}$ and $A_{Threshold}$ are predefined constants.

$$\text{Scale\_Similarity} = \frac{\max_j \frac{|\vec{e}_j|}{|\vec{f}^i_j|}}{\min_j \frac{|\vec{e}_j|}{|\vec{f}^i_j|}} \text{ and} \qquad (12)$$

$$\text{Angle\_Similarity}_i = \max_i \alpha_{i,j} - \min_j \alpha_{i,j} \qquad (13)$$

$\alpha_{i,j}$ is the directed angle from $\vec{e}$ to $\vec{f}^i_j$.

In ideal situations, Scale_Similarity$_i$ is 1 and Angle_Similarity$_i$ is 0 if polygon P and polygon $Q^i$ are similar. $S_{Threshold}$ and $A_{Threshold}$ are defined taking into account imaging and processing inaccuracies. If polygon P and polygon $Q^i$ are similar, then polygon P and polygon Q is also similar.

In various embodiments, removing a vertice refers to removing a vertex by merging two neighbouring vertices of the polygon having a shortest distance between them into one vertice. In various embodiments, removing a vertice refers to removing a vertex by removing a vertice in which a total distance of the vertice consisting of a first distance between the vertice and a first nearest neighbouring vertice and a second distance between the vertice and a second nearest neighbouring vertice is the smallest amongst all vertices of the polygon.

In various embodiments, if the first number of vertices is not equal to the second number of vertices, the index may be changed by the following $$\text{Index} = 1 - \frac{A - B}{(A + B)/2} \qquad (14)$$

A represents the number of vertices of the polygon having a greater number of vertices and B represents the number of vertices of the other polygon having a smaller number of vertices In various embodiments, if the first number of vertices is equal to the second number of vertices, the index may be changed by the following $$Index_{new} = Index_{old} \times constant \quad (15)$$

$Index_{new}$ is the changed index, $Index_{old}$ is the original index before it is changed and constant is a predefined constant.

Figure 22:
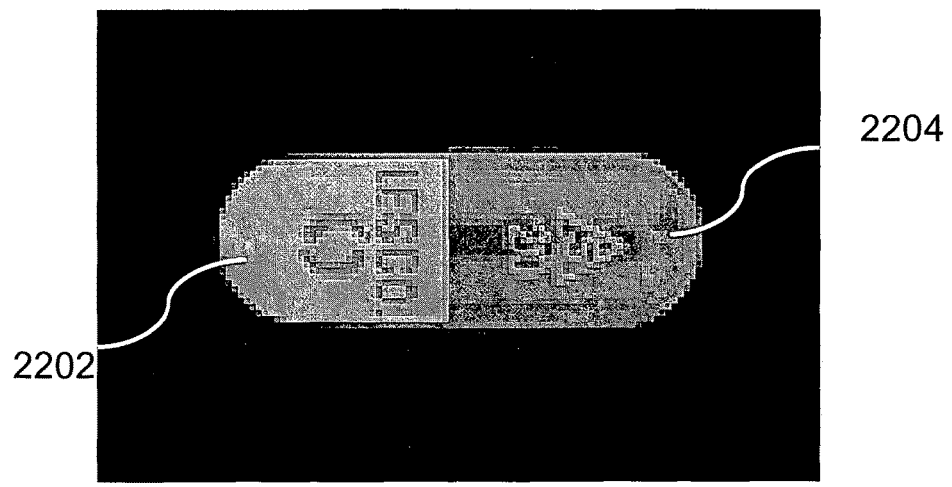
FIG. 22 shows an image of a capsule having two halves, the first half in white and the second half in red.

In various embodiments, determining the at least one property of the foreground component may include identifying a colour scheme of the foreground component, the colour scheme comprising at least one colour. In various embodiments, the colour scheme may include more than one colour. FIG. 22 shows an image of a capsule having two halves, the first half 2202 in white and the second half 2204 in red. In various embodiments, identifying the colour scheme includes identifying a combination of the number of the at least one colour and the colours of the at least one colour.

Figure 23:
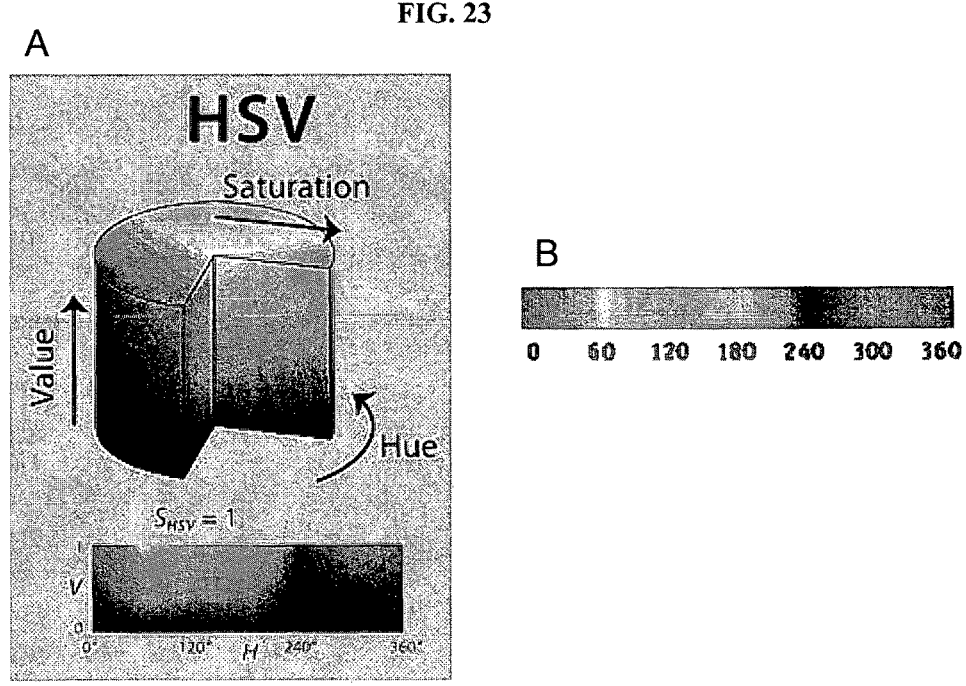
FIG. 23A is a diagram illustrating the hue-saturation-value (HSV) colour space.
FIG. 23B is a diagram illustrating the hue spectrum channel.

In various embodiments, colours may refer to different hues in the hue channel and identifying the colour scheme refer to identifying one or more hues of the foreground component. Hue is one of the main properties of a colour is defined technically (in the CIECAM02 model) as "the degree to which a stimulus can be described as similar to or different from stimuli that are described as red, green, blue and yellow. In various embodiments, colour may refer to other properties of colour such as chroma, saturation. In various embodiments, colour may refer to more than one properties of colour such as hue and saturation or hue and lightness. FIG. 23A is a diagram illustrating the hue-saturation-value (HSV) colour space. FIG. 23B is a diagram illustrating the hue channel. The entire hue channel is defined to be 360°.

In various embodiments, determining the colour scheme of the foreground component includes categorizing the at least one colour in one of the plurality of predetermined bins of quantized colours. This may be done based on the closeness of the at least one colour to the quantized colours. In other words, the colour is compared to each of the quantized colours and the colour is then categorized under the quantized colour that is closest to the colour.

Figure 24:
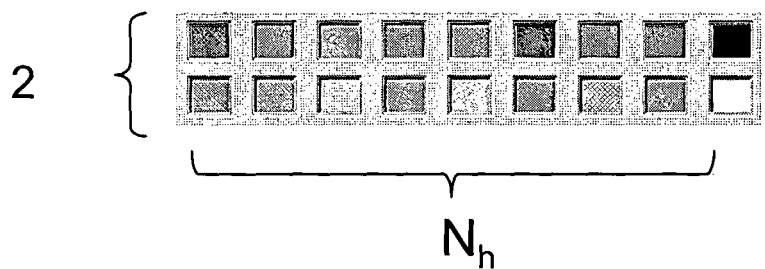
FIG. 24 is an illustration showing colour being quantized to 2 Nh+2 bins according to various embodiments.
Figure 25:
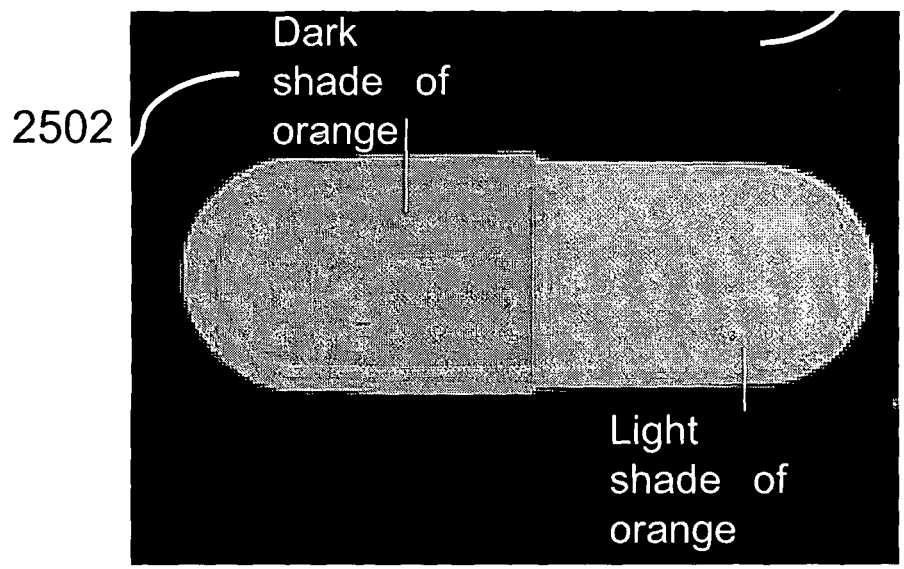
FIG. 25 shows an image of a capsule having two halves, the first half in a dark shade of orange and the second half in a bright shade of orange.

In various embodiments, the hue spectrum may be divided in to $N_h$ bins. In addition, a threshold on the is applied on saturation such that 2 $N_h$ bins of quantized colours are formed. Adding in white and black on the value channel, 2 $N_h+2$ bins of quantized colours are formed. In this case, colours are selected from hue, saturation and value channels and colour is being quantized to 2 $N_h+2$ bins. FIG. 24 is an illustration showing colour being quantized to 2 $N_h+2$ bins according to various embodiments. Each of the 2 $N_h+2$ bins is of a different colour to another bin due to differing hue, saturation and/or value. Advantageously, measuring saturation in addition to hue allows colours of similar hues but having different brightness to be distinguished also. Adding in two thresholds on the value channel allows white and black to be defined. FIG. 25 shows an image of a capsule having two halves, the first half 2502 in a dark shade of orange and the second half 2504 in a bright shade of orange. The two halves 2502 and 2504 have similar hues but different saturation. Defining thresholds for saturation allows the first half 2502 to be distinguished from the second half 2504.

In various embodiments, identifying the number of colour may be limited to wherein a maximum number of colours identified is three. In other words, only images with a foreground component having one colour or two colours or three colours may be identified. FIG. 26A to C illustrate identifying the number of colour wherein a maximum number of colours identified is three. FIG. 26A to C have three fields for identifying three different colours. FIG. 26A illustrates identifying a foreground component of a segmented image of a tablet having one colour. FIG. 26B illustrates identifying a foreground component of a segmented image of a capsule having two colours. FIG. 26C illustrates identifying a foreground component of a segmented image of a capsule having three colours. In FIG. 26A, two fields are empty as there is only one colour in the foreground component of the segmented image. In FIG. 26B, one field is empty as there is only two colours in the foreground component of the segmented image.

Figure 27:
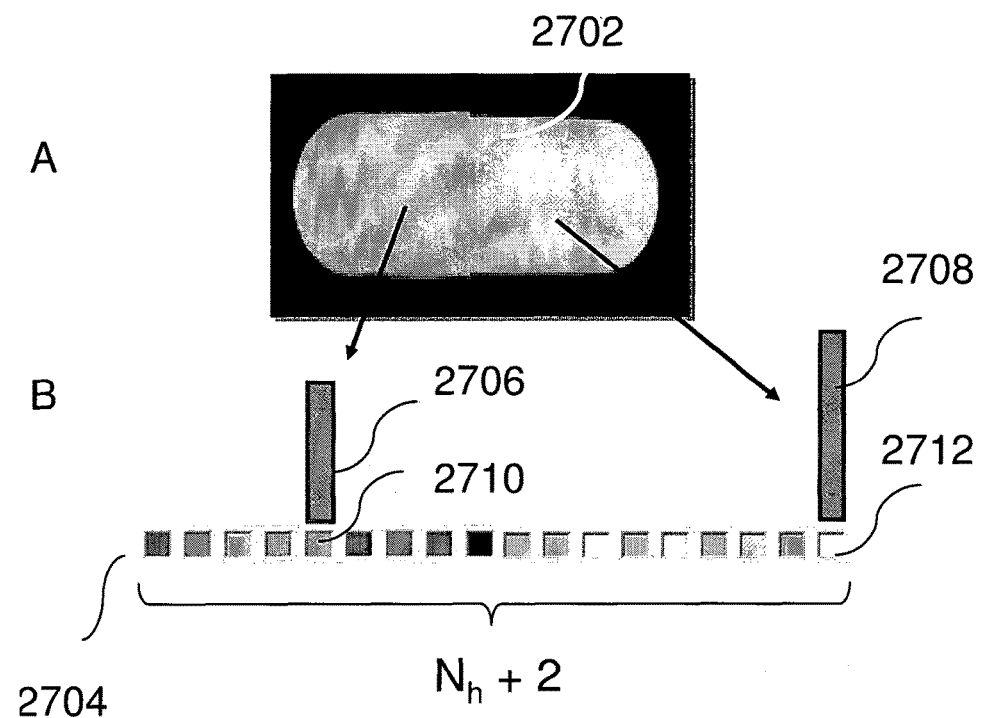
FIGS. 27A and B is a diagram illustrating identifying a colour scheme of the foreground component according to various embodiments of the present invention.

FIGS. 27A and B illustrate identifying a colour scheme of the foreground component 2702 according to various embodiments of the present invention. As shown in FIG. 27B, quantized colours 2704 are selected from hue, saturation and value channels to form 2 $N_h+2$ bins. Each pixel in the foreground component 2702 is then categorized in one of the 2 $N_h+2$ bins based on the closeness of the colour of the pixel and the quantized colour of the bins. The number of pixels categorized under each bin is then counted. The bars 2706 and 2708 indicates the relative numbers of pixels categorized under the quantized colours 2710 and 2712 respectively.

In various embodiments, identifying the colour scheme of the foreground component includes removing noise from the foreground component prior to categorizing the at least one colour in one of the plurality of predetermined bins of quantized colours.

Figure 28:
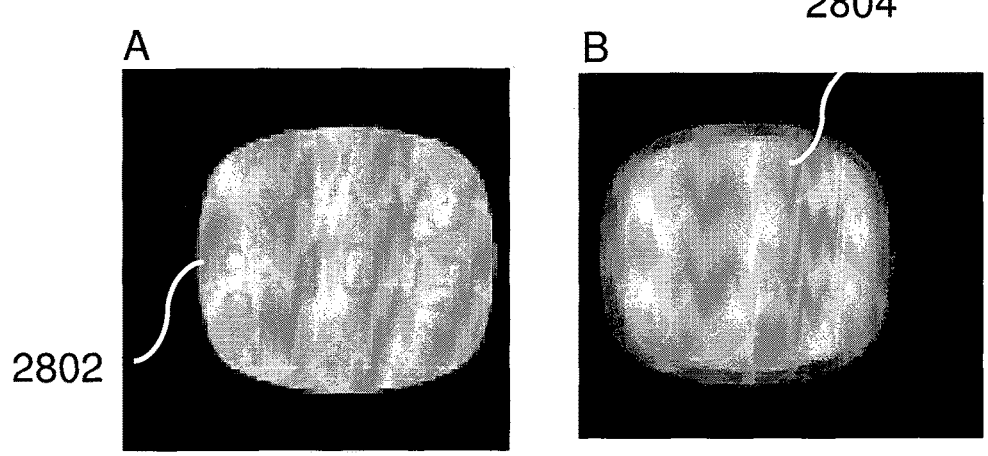
FIG. 28A shows a foreground component with imprint before applying the filter and FIG. 28B shows the foreground component after applying the filter according to various embodiments.

Imprints or inscriptions on the objects such as a pill or a tablet may be deemed as noise. In categorizing the colours in the foreground components under the quantized colours, it may be advantageous to remove noise such as imprints or inscriptions to improve the accuracy of matching later. A filter may be applied to a segmented image to remove the noise before the colour scheme of the foreground component is identified. FIG. 28A shows a foreground component with imprint before applying the filter and FIG. 28B shows the foreground component after applying the filter according to various embodiments.

In various embodiments, matching the at least one property of the foreground component with a database of identified objects includes determining the colour scheme of each identified object and determining the closeness of the colour scheme of the foreground component with the corresponding colour scheme of each identified object. In various embodiments, matching the at least one property of the foreground component with a database of identified objects includes determining the closeness of the colour scheme of the foreground component with the corresponding colour scheme of identified objects which are already stored in the database.

In various embodiments, the database images are ranked according to the degree of closeness with the colour scheme of the object and the database image having a corresponding colour scheme with the highest degree of closeness with the colour scheme of the object is then matched with the object. The degree if closeness between the colour scheme of the foreground component and the corresponding colour scheme of a database image may be calculated using the following:

$$Colour_{similarity}(Cq, Cd) = \frac{1}{C_1^q - C_1^d + 1} \quad (16)$$

if $C_1^q, C_1^d \neq -1 \wedge C_2^q = C_3^q = C_2^d = C_3^d = -1$

-continued $$\text{Colour}_{similarity}(Cq, Cd) = \frac{1}{2} \times \left( \frac{1}{C_1^q - C_1^d + 1} + \frac{1}{C_2^q - C_2^d + 1} \right) \quad (17)$$

if $C_1^q, C_1^d, C_2^q, C_2^d \neq -1 \wedge C_3^q = C_3^d = -1$ $$\text{Colour}_{similarity}(Cq, Cd) = \quad (18)$$

$$\frac{1}{3} \times \left( \frac{1}{C_1^q - C_1^d + 1} + \frac{1}{C_2^q - C_2^d + 1} + \frac{1}{C_3^q - C_3^d + 1} \right)$$

if $C_1^q, C_1^d, C_2^q, C_2^d, C_3^q, C_3^d, \neq -1$

Colour$_{similarity}$(Cq, Cd)=0 otherwise

C refers to a value used to represent the colour information, such as a value assigned to the hue channel. q represents that the colour information belonging to the foreground image of the segmented image. d represents that the colour information is from the database linked to an identified object or is obtained from an identified object in the database. The subscripts 1, 2, 3 refers to the first, second and third colour respectively. In the event that the foreground of the segmented object or the identified object in the database contains more than three colours, the excess colours are ignored. In the event that fields are blank, such as for FIGS. 26B and C, the value of C is assigned −1.

An accuracy of 81.69% has been achieved based on properties such as colour, shape and critical features using 224 images of pills, tablets, capsules and caplets in front of various backgrounds. The database contains 712 identified objects. In other words, this means that in more than 80% of the test cases, the method is able to select the correct identified object from the database to match the objects in the test cases.

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

By "about" in relation to a given numerical value, such as for temperature and period of time, it is meant to include numerical values within 10% of the specified value.

The invention claimed is:

1. A method to identify an object comprising:
   receiving an image, the image having an object in front of a background;
   segmenting the image into a segmented image using a segmentation technique, the segmented image having a foreground component showing at least a part of the object and a background component showing at least a part of the background; determining at least one property of the foreground component of the segmented image; and
   matching the at least one property of the foreground component with a database of identified objects having the corresponding at least one property to identify the object;
   wherein determining the at least one property of the foreground component comprises:
   identifying a contour of the foreground component;
   identifying a plurality of points along the contour of the foreground component;
   selecting a shape out a plurality of predefined shapes based on the plurality of points, wherein the at least one property of the foreground component comprises the shape selected based on the plurality of points; and
   reducing the plurality of points identified comprising:
     selecting a point;
     identifying a first neighboring point nearest the selected point;
     identifying a second neighboring point the second next nearest the selected point;
     determining an angle between a first line drawn between the selected point and the first neighboring point and a second line drawn between the selected point and the second neighbouring point; and
     removing the selected point if the angle exceeds a predetermined value.

2. The method to identify an object according to claim 1 further comprising:
   segmenting the image using further segmentation techniques into further segmented images to produce a plurality of segmented images; and choosing one or more segmented images from the plurality of segmented images for determining the at least one property of the foreground component.

3. The method to identify an object according to claim 2 wherein choosing the one or more segmented image from the plurality of segmented images comprises:
   determining a center point of the foreground component in each segmented image;
   calculating a coefficient of variation for each segmented image based on the distance of pixels belonging to the foreground component from the center point of the foreground component in the segmented image; and
   determining whether the coefficient of variation of each segmented image falls below a predetermined value.

4. The method to identify an object according to claim 2 wherein choosing the one or more segmented image from the plurality of segmented images comprises:
   determining number of pixels belonging to the foreground component in each segmented image; and
   determining whether the number of pixels belonging to the foreground component in each segmented image falls within a predetermined range of values.

5. The method to identify an object according to claim 1 wherein segmenting the image using the segmentation technique or techniques comprises:
   determining a number of color categories in the image;
   grouping each pixel of the image under one of the number of color categories based on similarities of color of each pixel to color of the color categories; and
   determining the foreground component and the background component of the image based on the grouped pixels.

6. The method to identify an object according to claim 5 wherein segmenting the image using the segmentation technique or techniques further comprises:
   determining a center point of the image;
   calculating distance of each pixel from the center points of the image; and
   grouping each pixel in the image under one of the number of color categories further based on the distance of the pixel from the center points of the image.

7. The method to identify an object according to claim 5 wherein segmenting the image using the segmentation technique or techniques further comprises:
   performing color conversion on each pixel to increase algorithm efficacy before determining the number of color categories in the image comprising:
   assigning hue, saturation, and lightness for each pixel in hue, saturation, and lightness (HSL) color space;
   equating value to the lightness for each pixel such that hue, saturation, and value (HSV) color space is defined for each pixel; and
   transforming hue, saturation, and value (HSV) color space to red, green, blue (RGB) color space for each pixel.

8. The method to identify an object according to claim 1 wherein segmenting the image using the segmentation technique or techniques comprises:
   identifying a range of colors such that pixels having the range of colors are grouped as the background component of the segmented image; and
   grouping pixels not having the range of colors as the foreground component of the segmented image.

9. The method to identify an object according to claim 1 wherein matching the at least one property of the foreground component comprises:
   rating similarity between the shape of the foreground component based on the plurality of points and an identified object in the database comprising:
   forming a first polygon having vertices formed from the shape a first of the number of foreground component and a second polygon having a second number of vertices derived from the identified object in the database;
   determining whether the first number of vertices is equal to the second number of vertices;
   removing a vertice from the polygon having a greater number of vertices and changing an index if the first number of vertices is not equal to the second number of vertices;
   reiterating comparison between the polygonal with reduced vertice and the remaining polygonal and changing the index until the first number of vertices is equal to the second number of vertices;
   determining whether the first polygon is similar to the second polygon if the first number of vertices is equal to the second number of vertices;
   removing a vertice from both the first polygon and the second polygon and changing the index if the first polygon is not similar to the second polygon but the first number of vertices is equal to the second number of vertices;
   assigning the index to the identified object if the first polygon is similar to the second polygon and the first number of vertices is equal to the second number of vertices; and
   reiterating comparison between polygonals with removed vertices and changing the index until the index is assigned;
   wherein the index indicates similarity between the shape of the foreground component and the identified objects;
   repeating rating similarity between the shape of the foreground component and subsequent identified objects in the database; and
   matching the foreground component to the identified object in the database having the highest index.

10. The method to identify an object according to claim 1 wherein the segmented image is a binary image having a first color and a second color, the first color for identifying the foreground component and the second color for identifying the background component.

11. The method to identify an object according to claim 1 wherein the object is a pill.

12. A method to identify an object comprising
   receiving an image, the image having an object in front of a background;
   segmenting the image into a segmented image using a segmentation technique, the segmented image having a foreground component showing at least a part of the object and a background component showing at least a part of the background; determining at least one property of the foreground component of the segmented image; and
   matching the at least one property of the foreground component with a database of identified objects having the corresponding at least one property to identify the object;
   wherein determining the at least one property of the foreground component comprises:
   identifying a contour of the foreground component;
   identifying a plurality of points along the contour of the foreground component;
   selecting a shape out a plurality of predefined shapes based on the plurality of points, wherein the at least one property of the foreground component comprises the shape selected based on the plurality of points; and
   reducing the plurality of points identified comprising:
   selecting a first point;
   selecting a second point;
   identifying a bounding box such that the first point falls on a first corner of the bounding box and the second point falls on a second corner of the bounding box diagonally opposite the bounding box from the first corner, the bounding box having a width and a height;
   determining a threshold of the bounding box based on the width and the height; and
   removing the second point if the threshold falls below a predetermined value.

13. A system for identifying an object comprising:
   an image receiver to receive an image, the image having the object in front of a background;
   a segmentor to segment the image into a segmented image using a segmentation technique, the segmented image having a foreground component showing at least a part of the object and a background component showing at least a part of the background;

a determinor to determine at least one property of the foreground component of the segmented image; and a matcher to match the at least one property of the foreground component with a database of identified objects having the corresponding at least one property to identify the object;

wherein the determinor to determine the at least one property of the foreground component comprises:

the determinor to identify a contour of the foreground component;

the determinor to identify a plurality of points along the contour of the foreground component;

the determinor to select a shape out a plurality of pre-defined shapes based on the plurality of points, wherein the at least one property of the foreground component comprises the shape selected based on the plurality of points; and the determinor to reduce the plurality of points identified by:
  selecting a point;
  identifying a first neighboring point nearest the selected point;
  identifying a second neighboring point the second next nearest the selected point;
  determining an angle between a first line drawn between the selected point and the first neighboring point and a second line drawn between the selected point and the second neighboring point; and
  removing the selected point if the angle exceeds a predetermined value.

* * * * *